(12) United States Patent
Walker et al.

(10) Patent No.: US 7,753,772 B1
(45) Date of Patent: Jul. 13, 2010

(54) SYSTEMS AND METHODS WHEREIN A PLAYER INDICATES AN ITEM THAT MAY BE RECEIVED BASED ON A GAME EVENT OUTCOME ASSOCIATED WITH THE PLAYER

(75) Inventors: Jay S. Walker, Ridgefield, CT (US); James A. Jorasch, Stamford, CT (US); Dean Alderucci, Ridgefield, CT (US); Stephen C. Tulley, Stamford, CT (US); Peter Kim, Stamford, CT (US)

(73) Assignee: Walker Digital, LLC, Stamford, CT (US)

( * ) Notice: Subject to any disclaimer, the term of this patent is extended or adjusted under 35 U.S.C. 154(b) by 1822 days.

(21) Appl. No.: 09/679,186

(22) Filed: Oct. 3, 2000

Related U.S. Application Data

(60) Provisional application No. 60/206,965, filed on May 25, 2000.

(51) Int. Cl.
*A63F 9/24* (2006.01)
*A63F 13/00* (2006.01)
*G06F 17/00* (2006.01)
*G06F 19/00* (2006.01)

(52) U.S. Cl. .................. 463/17; 463/1; 463/12; 463/13; 463/16; 273/138.1; 273/139; 273/292; 273/293; 340/323; 705/14; 705/35

(58) Field of Classification Search .............. 463/17, 463/9, 10, 16–22, 25–29, 40–42, 43; 273/138.1, 273/138.2, 139; 434/128; 700/90–92
See application file for complete search history.

(56) References Cited

U.S. PATENT DOCUMENTS

| 3,129,004 A | 4/1964 | Ritzler |
| 3,468,476 A | 9/1969 | Keegan |
| 4,854,490 A | 8/1989 | Jolliff et al. |
| 4,869,500 A | 9/1989 | Williams |
| 4,982,346 A | 1/1991 | Girouard et al. |
| 5,025,372 A | 6/1991 | Burton et al. ............... 364/406 |

(Continued)

FOREIGN PATENT DOCUMENTS

WO  WO 98/43149  10/1998

OTHER PUBLICATIONS

Dyer, Scott, "Lottery, Popeye's in Joint Venture to Promote Game", The Advocate(Baton Rouge, La.), Feb. 26, 1994, Saturday Metro Edition, News Section at p. 2B.

(Continued)

*Primary Examiner*—Dmitry Suhol
*Assistant Examiner*—Paul A. D'Agostino
(74) *Attorney, Agent, or Firm*—Fincham Downs LLC

(57) ABSTRACT

Systems and methods are provided to facilitate transactions. An indication associated with an item is received from a player, and a game event outcome associated with the player is determined. For example, a player may indicate that he or she is interested in receiving a free soft drink at a fast food restaurant, and a payout amount associated with the player's instant lottery ticket may be determined. It is then arranged for the player to receive the item based on information associated with the item and the game event outcome.

35 Claims, 18 Drawing Sheets

U.S. PATENT DOCUMENTS

| | | | | |
|---|---|---|---|---|
| 5,057,915 | A | 10/1991 | Von Kohorn | |
| 5,076,613 | A | 12/1991 | Kovacs | |
| 5,085,435 | A | 2/1992 | Rossides | 273/138 A |
| 5,099,232 | A | 3/1992 | Howes | |
| 5,173,851 | A | 12/1992 | Off et al. | |
| 5,216,595 | A | 6/1993 | Protheroe | |
| 5,269,521 | A | 12/1993 | Rossides | 273/138 R |
| 5,269,522 | A | 12/1993 | Chagoll et al. | |
| 5,361,871 | A | 11/1994 | Gupta et al. | |
| 5,362,051 | A | 11/1994 | Swafford, Jr. et al. | |
| 5,368,129 | A | 11/1994 | Von Kohorn | |
| 5,373,440 | A | 12/1994 | Cohen et al. | |
| 5,392,066 | A | 2/1995 | Fischer et al. | |
| 5,497,990 | A * | 3/1996 | Nanni | 463/18 |
| 5,551,692 | A | 9/1996 | Pettit et al. | |
| 5,620,182 | A | 4/1997 | Rossides | 273/138.2 |
| 5,668,591 | A | 9/1997 | Shintani | |
| 5,722,890 | A | 3/1998 | Libby et al. | |
| 5,729,697 | A | 3/1998 | Schkolnick et al. | |
| 5,791,991 | A | 8/1998 | Small | |
| 5,806,852 | A | 9/1998 | Howes | |
| 5,813,913 | A | 9/1998 | Berner et al. | |
| 5,816,918 | A | 10/1998 | Kelly et al. | 463/16 |
| 5,848,399 | A | 12/1998 | Burke | |
| 5,848,935 | A | 12/1998 | Noell et al. | |
| 5,851,149 | A | 12/1998 | Xidos et al. | |
| 5,855,514 | A | 1/1999 | Kamile | |
| 5,857,175 | A | 1/1999 | Day et al. | 705/14 |
| 5,859,414 | A | 1/1999 | Grimes et al. | |
| 5,871,398 | A * | 2/1999 | Schneier et al. | 463/16 |
| 5,882,258 | A | 3/1999 | Kelly et al. | |
| 5,883,620 | A | 3/1999 | Hobbs et al. | |
| 5,912,743 | A | 6/1999 | Kinebuchi et al. | |
| 5,918,211 | A | 6/1999 | Sloane | |
| 5,928,082 | A | 7/1999 | Clapper, Jr. | |
| 5,933,811 | A | 8/1999 | Angles et al. | |
| 5,939,695 | A | 8/1999 | Nelson | |
| 5,941,772 | A | 8/1999 | Paige | 463/20 |
| 5,979,757 | A | 11/1999 | Tracy et al. | |
| 5,983,196 | A | 11/1999 | Wendkos | 705/14 |
| 5,996,997 | A * | 12/1999 | Kamille | 273/139 |
| 6,003,013 | A | 12/1999 | Boushy et al. | |
| 6,009,412 | A | 12/1999 | Storey | |
| 6,012,984 | A | 1/2000 | Roseman | |
| 6,015,344 | A | 1/2000 | Kelly et al. | 463/16 |
| 6,017,032 | A | 1/2000 | Grippo et al. | 273/138.1 |
| 6,026,370 | A | 2/2000 | Jermyn | |
| 6,035,279 | A | 3/2000 | Montangero et al. | |
| 6,041,308 | A | 3/2000 | Walker et al. | |
| 6,048,268 | A | 4/2000 | Humble | |
| 6,089,981 | A | 7/2000 | Brenner et al. | |
| 6,138,911 | A | 10/2000 | Fredregill et al. | |
| 6,141,006 | A | 10/2000 | Knowlton et al. | |
| 6,165,070 | A | 12/2000 | Nolte et al. | |
| 6,165,072 | A * | 12/2000 | Davis et al. | 463/29 |
| 6,173,267 | B1 | 1/2001 | Cairns | |
| 6,251,017 | B1 * | 6/2001 | Leason et al. | 463/42 |
| 6,302,793 | B1 | 10/2001 | Fertitta et al. | |
| 6,401,074 | B1 | 6/2002 | Sleeper | |
| 6,439,997 | B1 | 8/2002 | Brasseur et al. | |
| 6,443,843 | B1 * | 9/2002 | Walker et al. | 463/42 |
| 6,447,395 | B1 | 9/2002 | Stevens | |
| 6,484,146 | B2 * | 11/2002 | Day et al. | 705/14 |
| 6,497,408 | B1 * | 12/2002 | Walker et al. | 273/138.1 |
| 6,527,638 | B1 * | 3/2003 | Walker et al. | 463/25 |
| 6,537,150 | B1 * | 3/2003 | Luciano et al. | 463/16 |
| 6,571,216 | B1 | 5/2003 | Garg et al. | |
| 6,578,012 | B1 | 6/2003 | Storey | |
| 6,663,105 | B1 | 12/2003 | Sullivan et al. | |
| 6,857,959 | B1 * | 2/2005 | Nguyen | 463/25 |
| 6,937,995 | B1 | 8/2005 | Kepecs | |
| 7,024,374 | B1 | 4/2006 | Day et al. | |
| 7,054,830 | B1 | 5/2006 | Eggleston et al. | |
| 2002/0013744 | A1 | 1/2002 | Tsunenari | |
| 2002/0107610 | A1 | 8/2002 | Kaehler et al. | |
| 2002/0138342 | A1 | 9/2002 | Clark et al. | |
| 2002/0143619 | A1 | 10/2002 | Laurie | |
| 2002/0147640 | A1 * | 10/2002 | Daniele et al. | 705/14 |
| 2003/0066883 | A1 | 4/2003 | Yu | |

OTHER PUBLICATIONS

"Gambling Devices", The Houston Chronicle, Feb. 22, 1998, Sunday 4 Star Edition, Section A at p. 42.

"MDI Reports Third Quarter and Nine-Month Results and Announces Significant Backing of Contracts; Merger with Lottery Channel Expected to Close by the End of April", Business Wire, Apr. 17, 2000.

"Florida Lottery Teams Up With Universal Studios for New 'Men in Black Alien Attack', Instant Ticket", Business Wire, Apr. 27, 2000.

amazon.com., "Wish List Birthday Giveaway", (http:www.amazon.com/exec/obidos/tg/cm/wishlist-birthday-cont.../), donwload date: Sep. 5, 2000.

Direct mail finds new level of sophistication; adopting high-tech methods builds store image, traffic increases; includes related article on Advo System's Marriage Mail Service, Chain Store Age Executive with Shopping Center Age, Dec. 1986, Section: vol. 62, ISSN: 0193-1199, 3 pp.

Sloane, Wendy, "Gambling: The New Game in Moscow, Legal or Not", The Associated Press, Jul. 22, 1991, Section: International News, 2 pp.

Stevens, Larry, "Despite a tough economy, retailers and others continue to test (and buy) new technology to keep old and new buyers happy", Computerworld, Mar. 2, 1992, 5 pp.

"County Attorney's Ruling Opens Doors For Phone Card Machines", Southwest Newswire, Aug. 6, 1996. 2 pp.

"Simmer Compuserve Hong Kong Chases Corporate Accounts", Newsbytes, Jun. 20, 1997, 2 pp.

Elson, Joel, "Checkout Prizes key Meijer toy event", Supermarket News, Dec. 1, 1997, Section: No. 48, vol. 47, p. 44, ISSN: 0039-5803, 2 pp.

"Betting Inc. and eBet.com Announce Merger to Pursue Estimated $200 Billion Global Home and Office Self-Serviced Electronic Wagering Industry", Business Wire, Jan. 6, 1999, 3 pp.

Sweeney, James P., "State loses round in suit on video slots; Argument on phone card dispenser rejected", The San Diego Union-Tribune, Apr. 8, 1999, Section: News, 3 pp.

"Catalina Marketing Solidifies In-Store Capabilities Through Acquisition of CompuScan", PR Newswire, Apr. 30, 1999, Section: Financial News, 2 pp.

Dennis, Sylvia, "Autoweb Signs Major Deal With Citibank", Newsbytes, Sep. 23, 1999, 2 pp.

Bronstad, Amanda, "BGI to back Web deal with $2.5 million offering", Austin Business Journal, Oct. 15, 1999, Section: vol. 19, No. 33, 3 pp.

MacDonald, John, "Judge rules phone cards are illegal gambling", The Bismarck Tribune, Mar. 3, 2000, Section: 2 pp.

Boey, Stephen, "Being first no guarantee of success: Wang", Business Times (Malaysia), Apr. 14, 2000, Section: Business IT, 2 pp.

Website: "Play 'Win While Shopping'", (http //www winwhileshopping com/contestpage htm), download date: Apr. 19, 2000, 3 pp.

Website: "PrizePoint Entertainment: Learn More", (http //www prizepoint com/ASPFiles/frames/afflearnmore asp), download date: Apr. 19, 2000, 2 pp.

Website: "PrizePoint Entertainment: See Our Prizes", (http //www prizepoint com/ASPFiles/frames/affwinprizes asp), download date: Apr. 19, 2000. 2 pp.

Website: "The Wheel of Food", (http //www roadsideamerica com/tour/94day7 html), download date: Apr. 19, 2000, 1 pg.

Website: "In-Store Instant-Win Games", (http //www catmktg com/manufacturer/frm_main_ instant htm), download date: May 8, 2000, 2 pp.

Orenstein, David, "Web Service Targets Shoppers at Checkouts", Computerworld, Jul. 5, 1999, 2 pp.

Sciacca, Patrick; Zimmerman, Kim Ann, "The Right Moves", Supermarket News, Dec. 13, 1999, 5 pp.

Tie-Up to Combine E-Service, E-Payment at Point of Sale, Business World, Mar. 6, 2000, 1 pg.

Pepe, Michael, @POS.com Grants License to Hand Held Products—Vendors team to offer POS solutions, Computer Reseller News, Mar. 20, 2000, 2 pp.

In-Store Instant-Win Games, http: // catmktg.com/ manufacturer/ frm_main_ instant.htm, download date May 10, 2000, 1 pg.

Welcome to @pos.com, IPOS Transaction Computer, http://atpos.com/prod_serv/ipos.html), download date: May 10, 2000, 1 pg.

Welcome to @pos.com: transaction platforms, (http: // atpos.com / prod serv / platrforms.html) download date May 10, 2000, 1 pg.

Ellis, Kristi Lamont, "Interactive Selling" Point of Purchase Magazine, (http: www. popmag.com / archives / 0200 / feb00stor2.html), May 30, 2000, 7 pp.

Hughes, Arthur Middleton, "Customer Specific Marketing", Database Marketing Institute (wysiwyg: // 98 / http: // www.dbmarketing.com/articles/art115.htm), 5 pp.

You can Win Pick Up An Entry Blank at any Big Y World Class Market, (http: // www. bigy. Com/ promo / winpromo .htm) download date: May 30, 2000, 2 pp.

Retail Solution Show Special—Alphanumeric Advocates In-Store TV Advertising, Retail Week, Jun. 2, 2000, 2 pp.

Brochure @pos.com, Copyright 1999, 4 pp.

Brochure NCR ScanMaster, Copyright 1999, NCR Corporation, 4 pp.

"My Jackpot.com", Undated. 2 pp.

"Omron ITM", The Magazine of Bank Management, Jan. 1989 Products & Services; p. 56, 1 pg.

Frensholt, Carol, "The New Buy-Ographics; Supermarket Promotions; Includes Related Articles", Supermarket Business, May 1995, vol. 50; No. 5; p. 26; ISSN: 0196-5700, 4 pp.

Notice of Allowance for U.S. Appl. No. 09/606,566 mailed Mar. 12, 2002, 6 pp.

Office Action for U.S. Appl. No. 09/606,566 mailed Jul. 19, 2001, 7 pp.

Office Action for U.S. Appl. No. 09/606,566 mailed Feb. 7, 2001, 9 pp.

Notice of Allowance for U.S. Appl. No. 10/234,075 mailed Jan. 10, 2008, 8 pp.

Notice of Allowance for U.S. Appl. No. 10/234,075 mailed Oct. 3, 2007, 7 pp.

Office Action for U.S. Appl. No. 10/234,075 mailed Mar. 27, 2007, 12 pp.

Office Action for U.S. Appl. No. 12/123,674 mailed Jul. 31, 2009, 9 pp.

Office Action for U.S. Appl. No. 12/123,674 mailed Jan. 8, 2009, 8 pp.

Office Action for U.S. Appl. No. 12/123,674 mailed Mar. 2, 2010, 29 pp.

* cited by examiner

PLAYER DEVICE IDENTIFIER: PD 789 — 700 — 710

| OUTCOME IDENTIFIER 712 | OUTCOME VALUE 714 | OUTCOME FORMAT 716 | OUTCOME STATUS 718 | REDEMPTION CODE 720 |
|---|---|---|---|---|
| OC 11111 | $10.00 | "YOU WIN!" | SURRENDERED | ABX8H345L |
| OC 11112 | $2.00 | [FIREWORKS.MPG] | EXECUTED | "APOLLO" |
| OC 11113 | $0.00 | [TRY_AGAIN?.WAV] | EXECUTED | - |
| OC 22222 | $50.00 | [YOU_WIN!.WAV] | SURRENDERED | 089576848 |
| OC 22223 | $0.00 | [TRY_AGAIN?.WAV] | EXECUTED | - |
| OC 22224 | $1.00 | [FIREWORKS.MPG] | NOT YET EXECUTED | 1011010101101... |

FIG. 7

| PRODUCT IDENTIFIER 802 | PRODUCT TYPE 804 | PRODUCT DESCRIPTION 806 | CURRENT RETAIL PRICE 808 | CURRENT AVAILABLE QUANTITY 810 | PROJECTED AVAILABLE QUANTITY 812 | PRODUCT CONVEYANCE RULE IDENTIFIER(S) 814 |
|---|---|---|---|---|---|---|
| P 001 | SPORTING GOODS | CALLOWAY® DRIVER | $359.00 | 9 | 2 | PCR 01; PCR 05 |
| P 002 | HOUSEWARES | STAINLESS TEA POT | $24.99 | 30 | 25 | PCR 05 |
| P 003 | MEN'S WEAR | DESIGNER SWEATER | $69.99 | 28 | 25 | PCR 03; PCR 05 |
| P 004 | HOUSEHOLD APPLIANCES | MAYTAG® REFRIGERATOR | $999.00 | 12 | 5 | PCR 04 |

FIG. 8

| PRODUCT CONVEYANCE RULE IDENTIFIER 1002 | PRODUCT CONVEYANCE RULE 1004 |
|---|---|
| PCR 01 | PROJECTED AVAILABLE QUANTITY ≥ 80% CURRENT AVAILABLE QUANTITY |
| PCR 02 | PROJECTED AVAILABLE QUANTITY ≥ 85% CURRENT AVAILABLE QUANTITY |
| PCR 03 | CURRENT DATE > 06/30 AND PRODUCT TYPE = "SUMMER FASHION" |
| PCR 04 | OUTCOME VALUE > $985.00 |
| PCR 05 | OUTCOME VALUE > 80% OF CURRENT RETAIL PRICE |

FIG. 10

| OUTCOME IDENTIFIER 1102 | OUTCOME VALUE 1104 | OUTCOME STATUS 1106 | PLAYER DEVICE IDENTIFIER 1108 | REDEMPTION CODE 1110 |
|---|---|---|---|---|
| OC 22222 | $50.00 | REDEEMED | PD 789 | 08976848 |
| OC 27542 | $0.00 | REDEEMED | PD 498 | -- |
| OC 24264 | $20.00 | REDEEMED | PD 272 | -- |
| OC 11112 | $2.00 | REDEEMED | PD 789 | -- |
| OC 60731 | $2.00 | OUTSTANDING | PD 886 | -- |
| OC 60284 | $0.00 | OUTSTANDING | PD 975 | -- |

SYSTEMS AND METHODS WHEREIN A PLAYER INDICATES AN ITEM THAT MAY BE RECEIVED BASED ON A GAME EVENT OUTCOME ASSOCIATED WITH THE PLAYER

CROSS-REFERENCES TO RELATED APPLICATIONS

The present application claims the benefit of U.S. Provisional Application Ser. No. 60/206,965 entitled "Methods and Apparatus for Providing Lottery Prizes Alternative to Cash Payment" and filed May 25, 2000. The entire content of this application is incorporated herein by reference.

The present application is related to: U.S. patent application No. 09/525,875 entitled "System and Method For Applying Lottery Multipliers" filed Mar. 14, 2000 and issued as U.S. Pat. No. 6,969,318 on Nov. 29, 2005; U.S. patent application No. 09/052,295 entitled "Methods and Apparatus Wherein a Lottery Entry is Entered Into Lottery Drawings Until the Lottery Entry is Identified as a Winner" filed Mar. 31, 1998 and issued as U.S. Pat. No. 6,086,477 on Jul. 11, 2000; U.S. patent application No. 09/107,971 entitled "Method and Apparatus for Facilitating the Play of Fractional Lottery Tickets Utilizing Point-Of-Sale Terminals" filed Jun. 30, 1998 and now abandoned; U.S. patent application No. 09/608,245 entitled "Systems and Methods Wherein a Lottery Number Combination is Associated with a Limited Number of Occurrences" filed Jun. 30, 2000 and issued as U.S. Pat. No. 6,688,976 on Feb. 10, 2004; U.S. patent application Ser. No. 09/274,281 entitled "Method and Apparatus for Providing Cross-Benefits via a Central Authority" filed Mar. 22, 1999; and U.S. patent application No. 09/606,566 entitled "System to Provide Game Play for Products" filed Jun. 29, 2000 and issued as U.S. Pat. No. 6,443,843 on Sep. 3, 2002. The entire contents of these applications are incorporated herein by reference.

FIELD

The present invention relates to facilitating transactions. In particular, the present invention relates to systems and methods wherein a player indicates an item that he or she may receive based on a game event outcome associated with the player.

BACKGROUND

Many people enjoy the entertainment provided by various types of gaming systems. For example, many people enjoy playing "scratch-off" style instant lottery games. In this type of game, a player purchases a paper game ticket for a fixed price (e.g., each game ticket may represent a one dollar wager). The player uncovers a portion of the game ticket, such as by scratching off a coating of latex, to reveal one or more symbols (e.g., revealing three symbols each representing a potential payout amount). Based on the revealed symbols, the player is able to determine a payout amount, if any, associated with the game ticket. One reason players enjoy this type of game is the participation the game provides, such as the participation provided by uncovering portions of the game ticket. Players also enjoy the instant gratification provided by such games. That is, players do not need to wait for a periodic lottery drawing, such as a selection of winning lottery numbers, to determine if they have won. Another reason players enjoy these types of games is that players can purchase a number of game tickets and play the game at their convenience.

Conventional instant lottery games, however, have a number of disadvantages. For example, it is expensive to produce and distribute the paper game tickets with appropriate symbols and latex coatings. Although different game formats may be made available to players (e.g., "win ten thousand dollars if a 'yes' is revealed when you scratch off this area" or "match three numbers on this game ticket to win that dollar amount"), only a limited number of game formats can be printed and distributed to merchants because of the cost and physical limitations associated with producing and distributing game tickets.

Another disadvantage associated with conventional instant lottery systems is that the level of participation provided to a player is limited. For example, a player's participation may be limited to scratching off certain areas on a game ticket. In addition, the gratification that can be provided to a player is limited. For example, a player with five dollars may only be able to purchase and play five game tickets.

These disadvantages may reduce a potential player's interest in the game, resulting in fewer game tickets being sold.

To overcome some of these disadvantages, U.S. Pat. No. 5,871,398 discloses an off-line remote transaction system which enables a player to purchase instant-type lottery game outcomes from a central computer. The player views the outcomes on a remotely located gaming computer, such as a Personal Digital Assistant (PDA). The outcomes may represent, for example, monetary amounts that have been won by the player.

Some players, however, may be not find it interesting to simply play for a single type of outcome. For example, a player may grow bored if his or her outcomes merely represent various dollar amounts.

Moreover, a merchant may be interested in selling an item at a reduced price without revealing the reduced price to a player. For example, a merchant may have a large inventory of a particular product, and that product may not be selling at a satisfactory rate. The merchant, however, may be reluctant to reduce the price of the product (and therefore the merchant's profit) with respect to all customers and all instances of inventory of that product. In this case, the merchant may want to offer the product to some customers at a reduced price without revealing the reduced price to customers.

SUMMARY OF THE INVENTION

To alleviate problems inherent in the prior art, the present invention introduces systems and methods for facilitating a transaction (e.g., the sale of an item and/or a lottery ticket to a player), wherein a player indicates an item that he or she is interested in receiving based on a game event outcome associated with the player.

In one embodiment of the present invention, an indication associated with an item is received from a player. A game event outcome associated with the player is determined, and it is arranged for the player to receive the item based on information associated with the item and the game event outcome.

Another embodiment is directed to facilitating a transaction in which a player purchases a product sold by a merchant. In this case, a product selection is received from the player. A payout amount associated with a lottery game is determined along with a price associated with the selected product. If the price associated with the selected product is within a predetermined range of the payout amount, it is arranged for the merchant to provide the selected product to the player.

In still another embodiment, payment of a wager amount is received from a player in exchange for a lottery ticket. A product identifier associated with a product is also received from the player, and a price associated with the product identifier is determined. A payout amount associated with the lottery ticket is determined and compared to the price. If the payout amount is within a predetermined range of the price, information is transmitted enabling the player to receive the product from a merchant.

In another embodiment, an indication associated with an item is received from a player. A value associated with a game event is determined, and it is arranged for the player to receive the item based on information associated with the item and the value associated with the game event. According to one embodiment, the value associated with the game event comprises an expected value.

In another embodiment, an indication associated with an item is received from a player. An outcome associated with a game event is determined, and it is arranged for the player to sell the item based on information associated with the item and the outcome associated with the game event.

In another embodiment, an outcome amount associated with a game event is determined. Based on the outcome amount, an item to be offered to a player instead of the outcome amount is determined. It is then arranged for the item to be provided to the player.

In another embodiment, an indication associated with an item is received from a player. An outcome associated with a game event is determined, and an indication is provided that the player will not receive the item based on information associated with the item and the outcome associated with the game event. According to one embodiment, it is then arranged for the player to receive payment of an amount based on the outcome.

In another embodiment, an indication associated with an alternate currency is received from a player. An outcome associated with a game event is determined and converted into an alternate currency amount. It is then arranged for the player to receive payment of the alternate currency amount.

In another embodiment, an indication is received from a merchant that an item has been provided to a player based on information associated with an item and a game event outcome. It is then arranged for the merchant to receive payment in exchange for providing the item to the player.

In another embodiment, a merchant receives an indication that an item should be provided to a player based on information associated with the item and an outcome associated with a game event. The merchant then provides the item to the player.

In another embodiment, a merchant provides an item to a player based on information associated with the item and an outcome associated with a game event. The merchant also receives payment in exchange for providing the item to the player.

In another embodiment, a player provides payment of a wager amount in exchange for a game event along with an indication associated with an item. The player then receives the item based on information associated with the item and an outcome associated with the game event.

In another embodiment, payment of a wager amount is received from a player in exchange for at least one game event. An indication associated with an item is received, and an outcome associated with the at least one game event is determined. It is then arranged for the item to be provided to the player based on information associated with the item and the outcome associated with the game event.

One embodiment of the present invention comprises: means for receiving from a player an indication associated with an item; means for determining a game event outcome associated with the player; and means for arranging for the player to receive the item based on information associated with the item and the game event outcome.

With these and other advantages and features of the invention that will become hereinafter apparent, the nature of the invention may be more clearly understood by reference to the following detailed description of the invention, the appended claims, and the several drawings attached herein.

BRIEF DESCRIPTION OF THE DRAWINGS

FIG. 7 is a tabular representation of a portion of a player outcome database according to an embodiment of the present invention.

FIG. 8 is a tabular representation of a portion of an inventory database according to an embodiment of the present invention.

FIG. 10 is a tabular representation of a portion of a product conveyance rules database according to an embodiment of the present invention.

FIG. 11 is a tabular representation of a portion of a provider outcome database according to an embodiment of the present invention.

DETAILED DESCRIPTION

Figure 1:
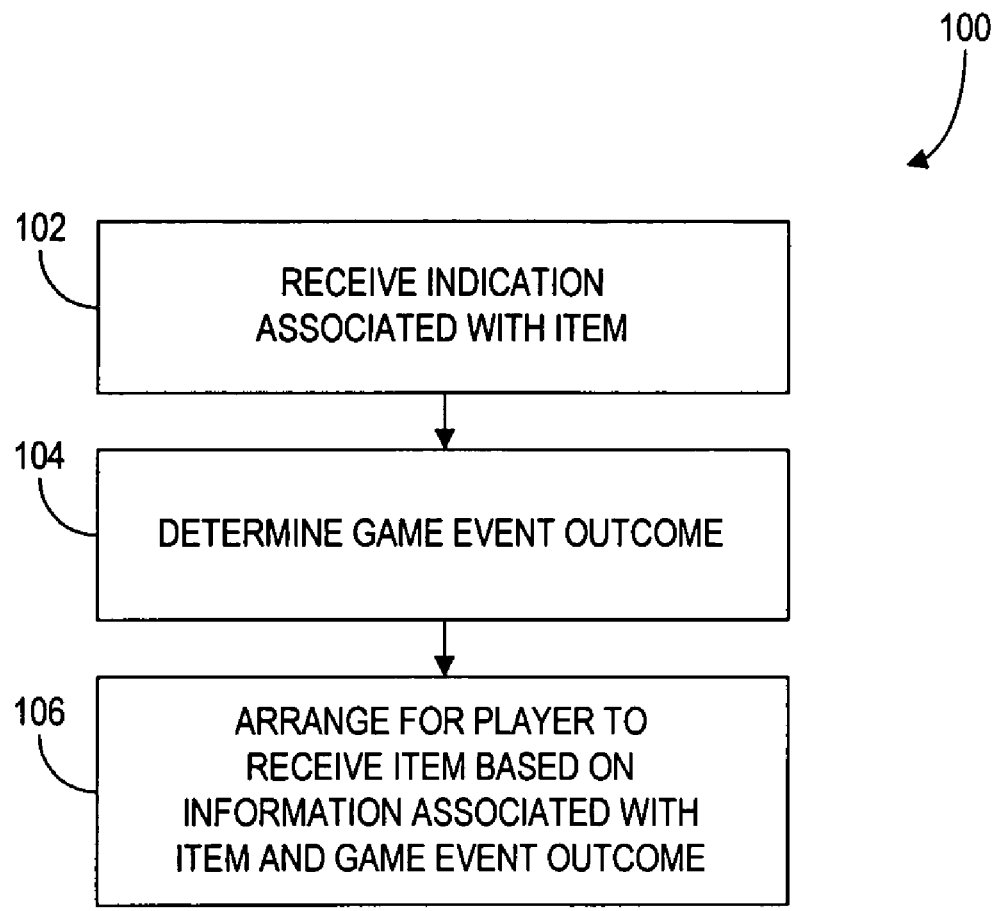
FIG. 1 is a flow chart of a method for facilitating transactions according to an embodiment of the present invention.

An embodiment of the present invention is directed to systems and methods wherein a player is interested in receiving an "item." As used herein, an item may be anything that can be exchanged with a player (e.g., a product, a service). For example, an item could be a grocery product, a software program, a book, a consumer electronics device, or a movie or airline ticket that a player is interested in receiving.

According to one embodiment the present invention, the player indicates the item he or she is interested in receiving based on a game event "outcome" associated with the player. A game event outcome may comprise, for example, an outcome of a game of chance. As used herein, a game event outcome may include an event result associated with the player (e.g., "you have won the item" or "you have not won the item"). A game event outcome may also include a payout amount (e.g., $2 or $50) associated with the player.

For example, a player may provide a payment of $10 to purchase a total of ten game events, each game event being associated with a respective outcome. If the player wishes, each of these outcomes can be revealed to the player as he or she plays a game. As one example, a game may simply comprise flipping a coin one time (e.g., a "heads" indicates that the player has won, and a "tails" indicates that the player has not won). In this case, the number of times the coin is flipped may represent a total number of games and/or events. Note, however, that each event may comprise a number of separate indications to a player. For example, a game may comprise flipping a coin three times (e.g., three "heads" indicates that the player has won, but at least one "tails" indicates that the player has not won). In this case, each set of three coin flips may represent a single event. Thus, in the case of a lottery game ticket, a single game ticket may be associated with a single event, a single game ticket may be associated with more than one event (e.g., more than one chance to win is provided with each game ticket), or a number of game tickets may be associated with a single event (e.g., the player must collect a number of game tickets to spell "W-I-N").

The amount of payment provided by a player in exchange for a number of events is referred to herein as a "total wager amount." The total wager amount may represent an amount of money that a player wagers with respect to a total number of events. For example, a player may provide a payment of $20 and receive twenty lottery game tickets (e.g., associated with twenty events). In this case, an "event wager amount" would represent an amount of money that a player wagers with respect to a single event (e.g., $1 in the previous example).

As used herein, a "total payout amount" represents an amount of money that a player wins with respect to a total number of events. For example, a player may play three slot-machine type games (i.e., associated with three events) and win a total of ten dollars. An "event payout amount," on the other hand, represents an amount of money a player wins with respect to a single event. As used herein, an "outcome amount" may be, for example, a total payout amount or an event payout amount.

Moreover, as used herein, a "payout percentage" may represent an average event payout amount per event wager amount. For example, if a $10 event wager amount will, on average, result in a $5 event payout amount, the payout percentage would be fifty percent. Another event parameter is an "expected value" associated with an event. The expected value may be computed, for example, by multiplying a potential event payout amount by a probability of winning. For example, if an event has a thirty percent chance of winning $2 and a seventy percent chance of winning nothing, the expected value would be $0.60 (i.e., 0.30*$2).

FIG. 1 is a flow chart of a method for facilitating a transaction 100 that may be performed in accordance with an embodiment of the present invention. At 102, an indication associated with an item is received. The received indication may be associated with one or more particular items that the player is interested in winning. Such an item may be, for example, a product, a service, an alternate currency amount (e.g., a retail store coupon or frequent flier miles), a reduction in a retail price associated with the item (e.g., a $10 or 25% reduction in a current retail price), a reduction of an amount previously owed by the player (e.g., an amount appearing on the player's credit card statement), and/or a future game event (e.g., thirty additional instant lottery tickets).

According to another embodiment, the item the player is interested in receiving may comprise an increase in an amount of payment to be received by the player. For example, consider a player who previously performed one or more tasks (e.g., by filling out surveys, watching advertisements, and/or selling items via a Web site) that earned him or her the right to receive an amount of payment. In this case, the player may be interested in having the amount of payment be increased.

The indication may be received from, for example, a player device and/or a merchant device. By way of example, the indication may be received via a merchant's Web site, the Internet, a gaming device (e.g., a video poker machine), a PDA, a kiosk, an electronic mail message, postal mail, a telephone, an Interactive Voice Response Unit (IVRU), an operator terminal (e.g., located at a telephone call center), a Point Of Sale (POS) terminal, an Automated Teller Machine (ATM) device and/or a shopping cart device.

The indication may comprise, for example, a code associated with the item (e.g., an item identifier) and may or may not be received from the player in a human-recognizable format. According to other embodiments, the indication may include an item category (e.g., a television) and/or an item feature (e.g. a picture-in-picture capability).

For example, a player may visit a retail store and decide that he or she is interested in receiving a book having a current retail price of $10. The player may use a scanner attached to an in-store kiosk to provide the book's Universal Product Category (UPC) code. According to another embodiment, the player may bring the book to a POS terminal to indicate that he or she is interested in receiving the item.

The indication may also include an item price (e.g., a current retail price or an item cost), a reduced item price, a player-defined item price, and/or a player-selected item price. For example, a player may indicate that he or she is interested in receiving a book having a current retail price of $10 in exchange for a payment of $5. According to another embodiment, the indication includes a probability of the player receiving the item. For example, a player may indicate that he or she is interested in having a 30% chance of receiving two movie tickets.

In addition to information about the item, the indication may include information about the player (e.g., a player identifier) and/or information about a game event (e.g., a game event identifier associated with a particular instant lottery ticket). Moreover, the indication may include information about a merchant that may provide the item to the player, information about a seller that may sell the item to the player (who may or may not be the same party as the merchant), and/or information about a lottery provider.

According to one embodiment, a list of available items is displayed to the player, who then selects one or more of the items from the list. According to another embodiment, a player who indicates that he or she is interested in receiving a first item is offered a substitute item in place of the first item.

As described above, a player may directly indicate that he or she is interested in winning an item based on a game event outcome. According to another embodiment, a player who is merely interested in purchasing an item in a conventional manner is provided with the following offer: "Are you interested in winning this item based on one or more game event outcomes?" (e.g., in exchange for one or more pre-stored instant lottery ticket outcomes).

Similarly, such an offer may be provided to a player who requests an item price or otherwise accesses information about the item (e.g., via a Web site). According to other embodiments, such an offer may be provided based on: information stored at a player device (e.g., a player's PDA), an indication from an input device associated with the player, an indication that the player is viewing information about the item, an indication that the player has viewed information about the item for a predetermined period of time, an indication that the player is providing payment for the item (e.g., via a credit card), an indication that the item is in a shopping cart (e.g., a conventional or virtual shopping cart), a search term (e.g., submitted to an Internet search engine), an indication that the player is no longer interested in purchasing the item (e.g., when the player removes the item from his or her virtual shopping cart), an indication that the player is not going to purchase the item at an original price, an indication that the player is interested in purchasing another item (e.g., an item associated with a competitor), an indication that the player is purchasing the item from another merchant, a bid for the item (e.g., via an online auction Web site), an offer to purchase the item including a player-defined price for the item, and an indication that another party is interested in purchasing the item (e.g., when the other party submits a higher bid via an online auction Web site).

At 104, a game event outcome is determined. For example, a player may have previously purchased twenty electronic instant lottery tickets (e.g., twenty game events) for $20. The outcomes associated with those twenty lottery tickets may have then been stored on his or her PDA (without being revealed to the player). The game events may comprise, for example, lottery games (including instant-type lottery games), games of chance (e.g., associated with a slot machine), and/or a game of skill (e.g., in which the player attempts to solve a word puzzle).

The game event outcome may be determined, for example, by determining a payout amount associated with the game event. Such a determination may be based on, for example, an expected value associated with the game event, a wager amount (e.g., an event wager amount and/or a total wager amount), a pre-stored outcome (e.g., pre-stored on the player's PDA), a received outcome, and/or a randomly generated outcome.

According to one embodiment of the present invention, the player provides payment in exchange for the game event before providing the indication of the item he or she is interested in receiving. According to another embodiment, the player provides such a payment at substantially the same time (e.g., as part of the indication) or even after providing the indication.

At 106, it is arranged for the player to receive the item based on information associated with the item and one or more game event outcomes. For example, the player may decide that he or she wants to use five of his or her twenty lottery tickets in an attempt to receive a book having a current retail price of $10. A merchant device (e.g., associated with a retail store) then receives the following five pre-stored lottery ticket outcomes from the player's PDA: $0, $1, $0, $5, and $2. The merchant device compares the total outcome amount (i.e., $8) with the current retail price of the book (i.e., $10) and determines that the book will be provided to the player. The merchant device may determine to provide the book to the player for less than the current retail price if, for example, the merchant has a large number of those books in inventory. In this case, a message may be displayed at a POS terminal indicating that the player has won the book.

The merchant would then provide the item to the player and receive payment in exchange for the lottery outcomes (e.g., from a lottery provider). Note that in this case the merchant was able to sell the book at a reduced price without revealing the reduced price to the player.

According to some embodiments of the present invention, a player device, a merchant device, and/or a payment device (e.g., a credit card device) may arrange for the player to receive the item based on information associated with the item and one or more outcomes. According to another embodiment, a seller other than the merchant who provides the item is involved in the transaction. For example, a book publisher may sell the book to the player at a reduced price while a book merchant actually provides the book to the player. In this case, the book publisher may receive payment from a lottery provider (e.g., a payment based on a number of lottery outcomes) and provide payment to the book merchant (e.g., in exchange for providing the book to the player). The seller may be, for example, a lottery provider, a merchant, a retail store (e.g., where the item is being offered for sale), a manufacturer, and/or any other party.

As described above, the determination of whether an item will be provided to the player may be based on the game event outcome and information associated with the item, such as a current retail price of the item. The information associated with the item may also comprise, for example, an item cost, a minimum acceptable price, a minimum acceptable profit, a discount amount, a product conveyance rule (e.g., allow a 10% discount if at least fifty items are currently in inventory and 50% otherwise), and/or revenue management information (e.g., supply and/or demand information).

The determination of whether an item will be provided to the player may also be based on, for example, information associated with the player (e.g., whether the player is a frequent customer), information associated with a merchant, information associated with a lottery provider (e.g., a rate at which items are being won by players), and/or information associated with a seller.

According to one embodiment, the player transmits a request to receive an item in exchange for one or more game event outcomes to a merchant device. The merchant device may then determine a price associated with the item (e.g., a current retail price) and compare that price with a payout amount associated with the game event or events. If the price is within a predetermined range of the payout amount, the item is provided to the player.

According to another embodiment, a transaction request, including the payout amount, is transmitted (e.g., from a player device or a lottery provider device) to a merchant device. A transaction response is received from the merchant device (e.g., indicating whether or not the transaction may be completed), and the item may be provided to the player based on the transaction response.

A wager amount and/or an outcome amount associated with a game event may represent, for example, a dollar amount or an amount of alternate currency associated with a merchant. For example, the outcome amount may represent thirty dollars or a forty dollar department store gift certificate. According to one embodiment, a conversion is performed between a dollar amount and an alternate currency amount (e.g., a merchant device may double a dollar amount to establish or determine an alternate currency amount).

According to one embodiment, a quantity of an item to be provided to the player is determined based on the game event outcome. For example, a player may indicate that he or she is interested in receiving gasoline based on outcomes associated with one or more game events. In this case, a number of gallons of gasoline to be provided to the player may be determined. Similarly, a quality of the item (e.g., a grade of gasoline) can also be determined.

According to another embodiment, information associated with the game event is adjusted based on the item the player is interested in receiving. For example, a probability of winning an event may be increased if the item has a low retail price and decreased if the item has a high retail price. Such an adjustment may be performed, for example, in accordance with a predetermined formula, a predetermined rule, and/or a conversion table.

To arrange for an item to be provided to a player, information enabling the item to be delivered to the player may be transmitted (e.g., a controller may transmit information to an online merchant indicating that entertainment information should be downloaded to a player's PDA). According to another embodiment, information enabling the player to take possession of the item is transmitted. For example, a code may be transmitted to a player (e.g., in human recognizable format), a player device, a payment device (e.g., a credit card device) and/or a merchant device (e.g., a retail store POS terminal).

Transaction Examples

Consider a player who accesses a Web site associated with a lottery provider using her home Personal Computer (PC). She supplies her credit card number to the lottery provider during a registration process and indicates that she would like to receive $5 worth of game events. The lottery service charges $5 using her credit card number and retrieves the outcomes of five instant lottery tickets (costing one dollar each) previously purchased by the lottery provider from a lottery authority. Those five outcomes were: $0, $2, $6, $0, and $0 respectively. The lottery service transmits the five outcomes to her PC where they are stored without being displayed to the player.

The player then uses her PC to access a Web site associated with an online book merchant. She finds a travel book she may be interested in purchasing and places an indication of the book into her virtual shopping cart. The travel book has a retail price of $12, but the book merchant determines that a lower price may be appropriate because an updated version will soon be released by the publisher. As a result, the book merchant asks the player if she would be interested in using some of her instant lottery tickets in an attempt to win a copy of the book.

The player decides that she will use three of her instant lottery tickets to try to win a copy of the book. The book merchant accesses the first three outcomes stored on her PC (i.e., $0, $2, and $6 for a total of $8). The book merchant decides that $8 is an acceptable price for the book, and ships the book to the player (e.g., without indicating to her that the book has been provided at a reduced price). The book merchant also arranges to receive the $8 from the lottery service. If the book merchant had instead decided that $8 was not an acceptable price, the value of the three outcomes may have been left on her PC (e.g., without being revealed to her). According to another embodiment, the $8 would have simply been paid to the player (e.g., without sending the book to her). According to still another embodiment, she may have lost the right to receive the $8.

Consider now what could have happened if the travel book was instead associated with a retail price of $5 (i.e., an amount less than the $8 associated with her three lottery ticket outcomes). In this case, the extra $3 may have been provided back to the player (e.g., as a direct payment or by being applied to her remaining two lottery ticket outcomes). According to another embodiment, either the online merchant or the lottery provider may have kept the extra $3.

In another example, a player visits a retail store and brings two Compact Discs (CDs) to a lottery kiosk located in the retail store. He uses a scanner attached to the kiosk to input the UPC codes associated with the CDs. A display screen on the kiosk then asks the player to enter a desired winning probability. The player uses a keyboard attached to the kiosk to indicate that he is interesting in having an 80% winning probability.

The display screen on the kiosk indicates to the player that he should offer to provide twelve one-dollar lottery tickets in order to achieve an 80% probability of winning the two CDs. He swipes his credit card into a magnetic stripe reader attached to kiosk and requests to purchase twelve one-dollar lottery tickets.

The kiosk communicates this request to a lottery provider and receives an indication from the lottery provider that the twelve lottery tickets are associated with a total payout amount of $10. The kiosk compares this amount with a minimum acceptable price of $12 associated with the CDs and indicates to the player that he did not win the CDs. The kiosk, however, also indicates to him that he can receive the CDs in exchange for the twelve lottery tickets and an extra payment of $2 (i.e., the minimum acceptable price less of $12 less the total payout amount of $10). The player agrees, and the kiosk prints a receipt that enables him to leave the store with the CDs.

Transaction Systems

Figure 2A:
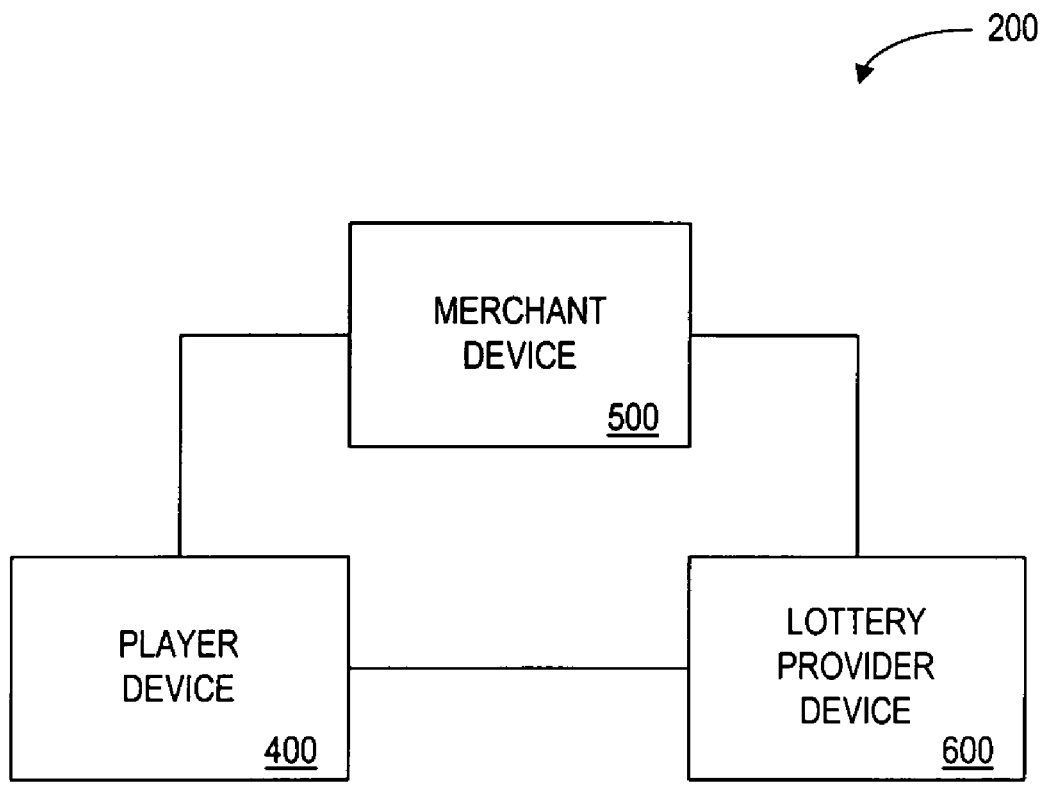
FIG. 2A is a block diagram overview of a transaction system according to an embodiment of the present invention.

Turning now in detail to the drawings, FIG. 2A is a block diagram overview of a transaction system 200 according to one embodiment of the present invention. As will be described, the transaction system 200 may be used to facilitate transactions. The transaction system 200 includes a player device 400 in communication with a merchant device 500 and a lottery provider device 600. As used herein, devices (such as the player device 400, the merchant device 500, and/or the lottery provider device 600) may communicate, for example, via a communication network, such as a Local Area Network (LAN), a Metropolitan Area Network (MAN), a Wide Area Network (WAN), a Public Switched Telephone Network (PSTN), a Wireless Application Protocol (WAP) network, or an Internet Protocol (IP) network such as the Internet, an intranet or an extranet. Moreover, as used herein, communications include those enabled by wired or wireless technology. Note that although a single player device 400 is shown in FIG. 2A, any number of player devices 400 may be included in the transaction system 200. Similarly, any number of the other devices described herein may be included in the transaction system 200 according to embodiments of the present invention.

In one embodiment of the present invention, the player device 400 communicates with a remote, Web-based lottery provider device 600 (e.g., a server) via the Internet. Although some embodiments of the present invention are described with respect to information exchanged using a Web site, according to other embodiments information can instead be exchanged, for example, via: a telephone, an Interactive Voice Response Unit (IVRU), electronic mail, a WEBTV® interface, a cable network interface, and/or a wireless communication system.

The lottery provider device 600 may be any device capable of performing various functions described herein. For example, the lottery provider device 600 may be a PC associated with a state lottery and configured to generate and/or transmit game event outcomes, a total payout amount and/or an indication of a total payout amount.

Similarly, the player device 400 and the merchant device 500 may be any device capable of performing various functions described herein. The player device 400 may be, for example: a PC, a portable computing device such as a PDA, a wired or wireless telephone, a one-way or two-way pager, a kiosk (e.g., an instant lottery kiosk located at an airport terminal), an ATM device, a POS terminal, a game terminal (e.g., a video poker terminal), a smart card, or any other appropriate storage and/or communication device.

Note that the devices shown in FIG. 2A need not be in constant communication. For example, the player device 400 may only communicate with the lottery provider device 600 via the Internet when appropriate (e.g., when attached to a "docking" station or "cradle" coupled to the player's PC). The player device 400 may also communicate with the merchant device 500 via an infrared device when near a kiosk located in a merchant's store.

Any of the player device 400, the merchant device 500, and/or the lottery provider device 600 may be incorporated in a single device (e.g., a kiosk located in a merchant's store may act as both the player device 400 and the merchant device 500).

According to an embodiment of the present invention, the player device 400 may store game event outcomes purchased via the lottery provider device 600. The player device 400 may also be used to indicate an item a player is interested in receiving based on one or more of those game event outcomes. For example, the merchant device 500 may evaluate information associated with the item (e.g., a retail price) and the outcome associated with at least one game event to determine if the item will be provided to the player. According to one embodiment, neither the information associated with the item nor the outcome associated with the game event are displayed to the player. According to another embodiment, one or both of these values are indicated to the player (e.g., by being displayed or otherwise output via the player device 400 and/or the merchant device 500).

According to one embodiment of the present invention, at least one of following parameters are also determined (e.g., by the merchant device 500): an event wager amount, a number of game events, and/or a probability that the item will be provided to the player. For example, the merchant device 500 may calculate that a player will have a 20% chance of winning an item in exchange for three game event outcomes. Such information may then be indicated to the player (e.g., via the player device 400 and/or the merchant device 500). Other parameters that may be calculated and/or displayed to the player include a required wager amount, a required number of game events, a suggested wager amount, a suggested number of game events, and a probability that the item will be provided to the player. For example, the player devices 400 may display the following message: "If you want to try to win this pair of shoes, you must use at least twenty of your lottery tickets."

For example, a player may indicate that he or she is interested in receiving a $100 item in exchange for three game tickets. In this case, a total value associated with the three game tickets (e.g., an expected value, a total wager amount, or an average payout amount) may be, for example, $3 (i.e., 0.03 of the retail price) may be determined, and a random process may be used to generate a random number from 0.01 through 1.00. If the randomly generated number is less than or equal to 0.03, the item is provided to the player. If the randomly generated number is more than 0.03, the item is not provided to the player. In either case, the player surrenders the three game tickets to the transaction system 200.

According to one embodiment, a player enters a player-defined game parameter via the transaction system 200. For example, a player may select a wager amount, a number of game events, and/or a probability that he or she will win an item. For example, a player may use his or her player device 400 to indicate that the transaction system 200 should determine the number of game event outcomes that are required to result in a 100% probability of winning a particular item.

The merchant device 500 may communicate with the lottery provider device 600 to arrange for the merchant to receive payment in exchange for providing the item to the player. According to one embodiment, an excess payout amount (e.g., over and above a retail price associated with the item) is determined. In this case, the excess payout amount may be provided to, for example, the lottery provider, the merchant that provided the item to the player, a seller that sold the item to the player (e.g., a manufacturer), and/or the player.

According to one embodiment, the player uses his or her player device 400 to play a game during which a result associated with the transaction is revealed to the player. In this case, information associated with an item may be incorporated into play of the game. For example, a player may indicate that he or she is interested in receiving a shirt. In this case, the player may use his or her PDA to open electronic representations of boxes, and one of the boxes may open to reveal a picture of the shirt (e.g., indicating that the player has won the shirt).

The merchant device 500 may compare an outcome amount associated with a lottery game with a price associated with a selected product (e.g., selected by a player via a player device 400). If the price associated with the selected product is within a predetermined range of the payout amount (e.g., within a predetermined dollar amount or a predetermined percentage), the merchant device 500 may arrange for the merchant to provide the selected product to the player.

According to another embodiment, the lottery provider device 600 may receive from a player payment of a wager amount in exchange for a lottery ticket. The player device 400 may then transmit a product identifier associated with a product to the merchant device 500 along with in indication of a payout amount associated with the lottery ticket. The merchant device 400 may determine a price associated with the product identifier, and if the payout amount is within a predetermined range of the price, information enabling the player to receive the product from a merchant may be transmitted to the player device 400.

According to another embodiment, another value associated with a game event may be used to determine if the player will receive an item from a merchant. For example, the merchant device 500 may use a wager amount or an expected value associated with a game event may to make such a determination.

According to still another embodiment, a player may sell (as opposed to purchase) an item in the transaction. For example, a player may arrange to sell a used item at a particular price based on one or more lottery ticket outcomes.

According to still another embodiment, a player device 400 may suggest to a player that he or she accept an item in place of payment of a payout amount. Such a suggestion may be made, for example, before the value of the payout amount is revealed to the player.

Figure 2B:
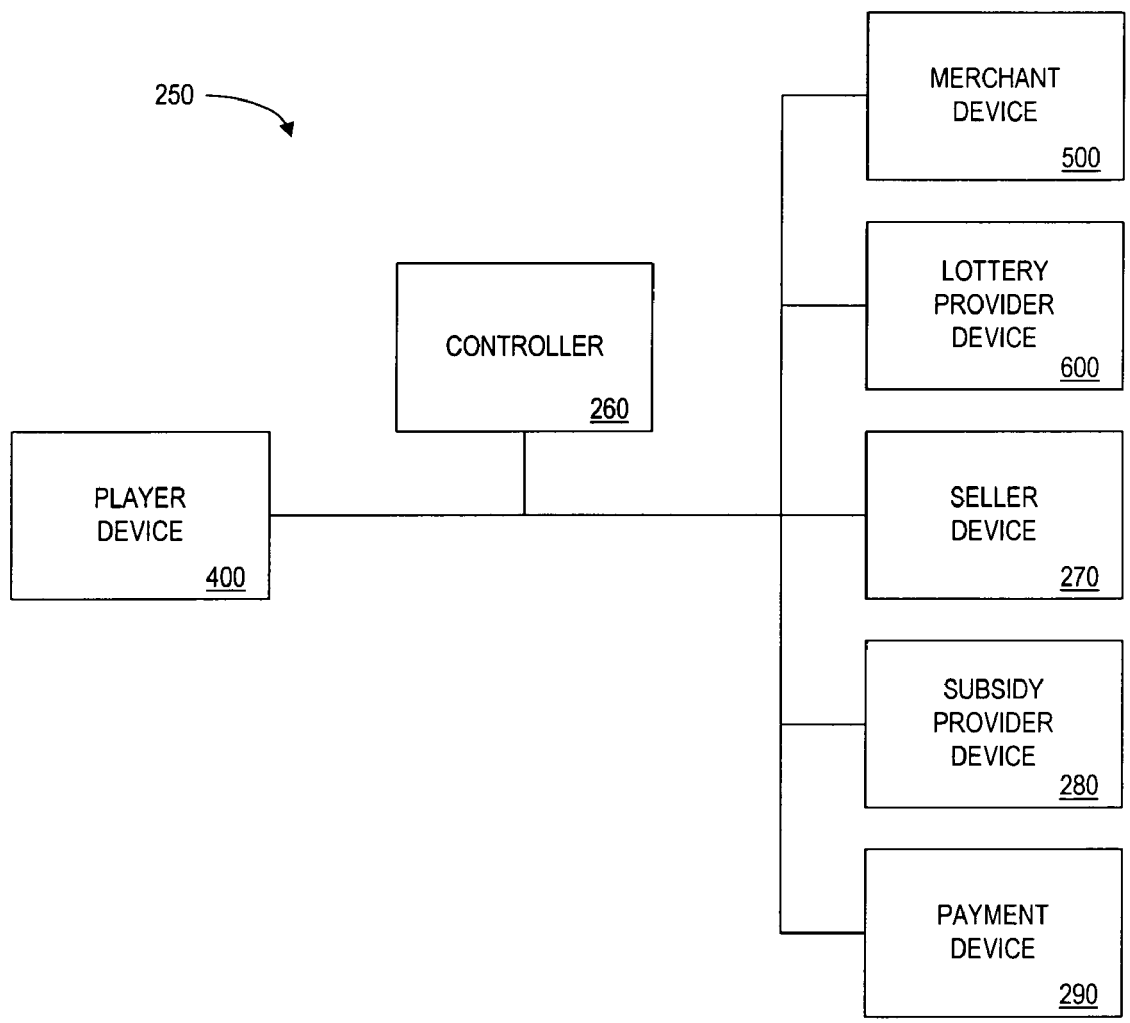
FIG. 2B is a block diagram overview of a transaction system according to another embodiment of the present invention.

FIG. 2B is a block diagram overview of a transaction system 250 according to another embodiment of the present invention. As before, the player device 400 may communicate with the merchant device 500 and/or the lottery provider device 600.

A controller 260 may also communicate with these devices. For example, the controller 260 may communicate with a number of player devices 400, a number of merchant devices 500, and/or a number of different lottery provider devices 600 to facilitate transactions. In this case, the controller 260 may perform some or all of the functions described herein with respect to the player device 400, the merchant device 500, and/or the lottery provider device 600.

A seller device 270 may also be included in the transaction system 250 when a party other than the merchant will sell an item to a player. For example, the seller device 270 may exchange information on behalf of a product manufacturer who sells a product to a player.

A subsidy provider device 280 may arrange for benefits to be applied to transactions in exchange for the performance of one or more tasks by the player. Some examples of benefits and tasks are disclosed, for example, in U.S. patent application Ser. No. 09/274,281 entitled "Method and Apparatus for Providing Cross-Benefits via a Central Authority," the entire content of which is incorporated herein by reference.

A payment device 290 may be used, for example, to arrange for a player to provide or receive payments. For example, the lottery provider device 600 may arrange for a player to purchase one or more game events via the payment device 290 (e.g., via a credit card account, a debit card account, a banking account, or an electronic payment protocol).

Transaction Flow

Figure 3:
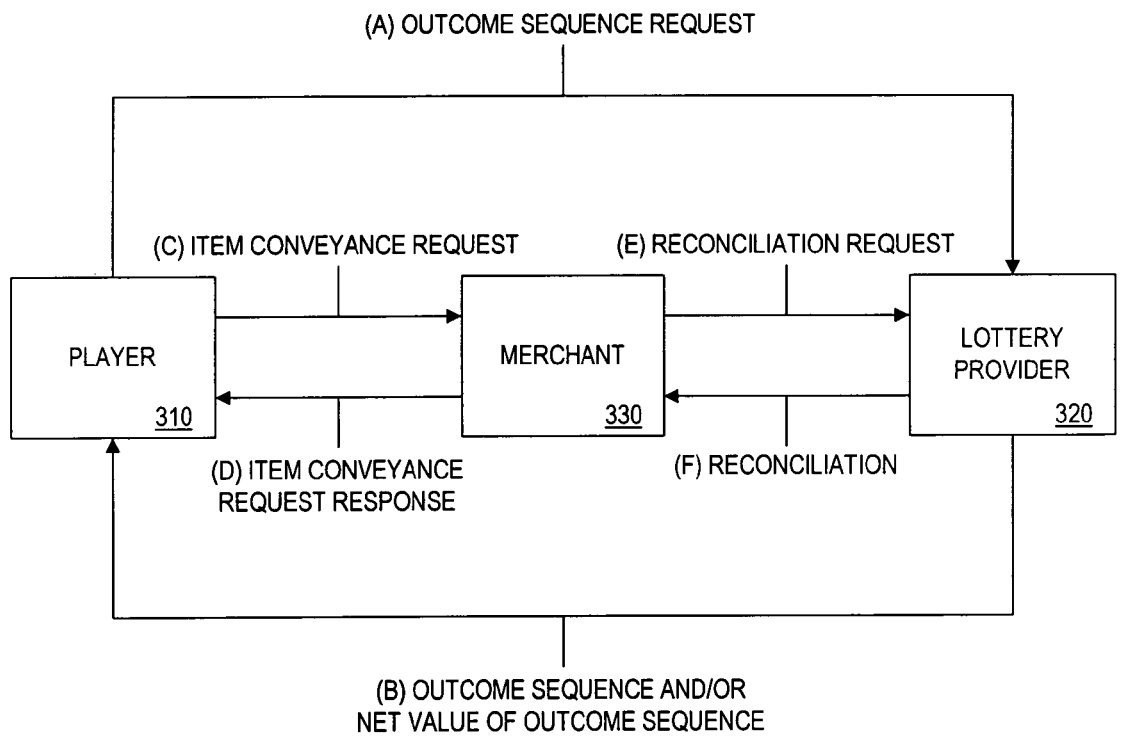
FIG. 3 is a transaction flow diagram according to an embodiment of the present invention.

FIG. 3 is a transaction flow diagram according to an embodiment of the present invention. A player 310 provides an outcome sequence request to a lottery provider 320 at (A). For example, the player 310 may communicate such a request to an employee at a retail store. According to another embodiment, the player 310 communicates such a request via a communication network (e.g., using a Web site associated with the lottery provider 320). The lottery provider 320 then provides an outcome sequence (e.g., $0, $0, $2, $5, $0) and/or a net value of an outcome sequence (e.g., the five requested outcome sequences have a net value of $7) to the player 310 at (B). When the lottery provider 320 provides a net value of an outcome sequence, a player device may in turn divide the net value into a number of different game event outcomes.

At (C), the player 310 provides an item conveyance request to a merchant 330. For example, the player 310 may bring the item to a POS terminal or to a kiosk located at a retail store. According to another embodiment, the player 310 provides the item conveyance request via a PDA, the item conveyance request including an item identifier and a number of outcomes. The merchant 330 evaluates the item conveyance request based on information associated with the item and one or more outcomes associated with the player 310 and generates an item conveyance request response at (D). The item conveyance request response may indicate, for example, if the item will be provided to the player 310.

At (E), the merchant provides a reconciliation request to the lottery provider 320. The reconciliation request may indicate, for example, an outcome sequence and/or a net value of an outcome sequence, such as a sequence representing a portion of the outcome sequence purchased by the player 310 at (A) and provided to the player 310 at (B). The lottery provider 320 then provides reconciliation to the merchant 330 at (F), such as by arranging for the merchant 330 to receive payment in exchange for providing the item to the player.

Player Device

Figure 4:
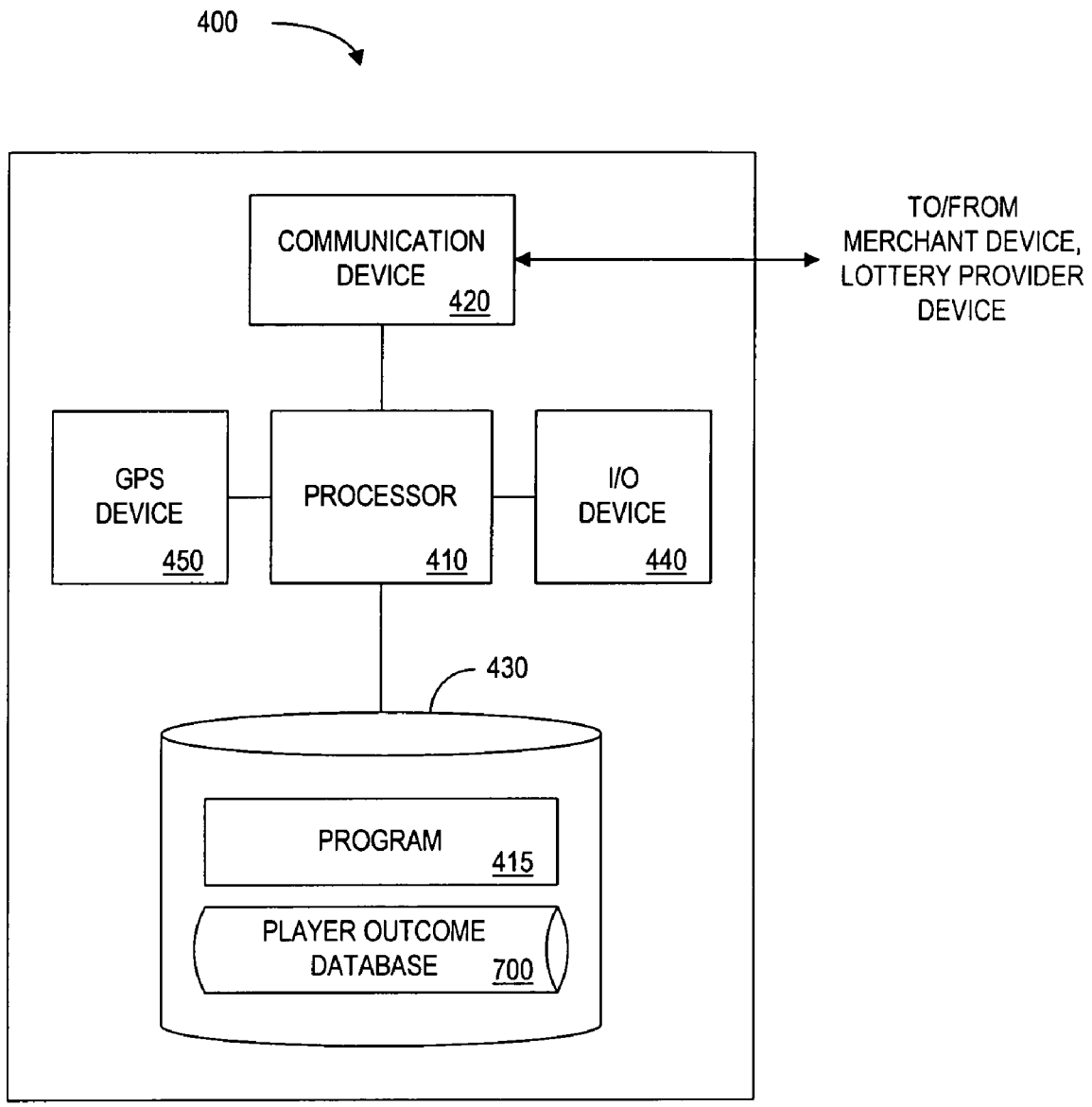
FIG. 4 is a block diagram of a player device according to an embodiment of the present invention.

FIG. 4 illustrates a player device 400 that is descriptive of the device shown in FIGS. 2A and 2B, according to an embodiment of the present invention. The player device 400 comprises a processor 410, such as one or more INTEL® Pentium® processors, coupled to a communication device 420 configured to communicate via a communication network (not shown in FIG. 4). The communication device 420 may be used to communicate, for example, with the merchant device 500 and/or the lottery provider device 600.

The processor 410 is also in communication with an Input/Output (I/O) device 440.

The I/O device 440 may comprise an input device, such as a keyboard, a mouse or other pointing device, a microphone, a knob or a switch (including an electronic representation of a knob or a switch), a bar code scanner (e.g., configured to read UPC codes), an infrared port, a docking station, and/or a touch screen. Such an I/O device 440 may be used, for example, to receive an indication associated with an item from a player. Such an I/O device 440 may also be used by a player to play a game (e.g., by manipulating electronically represented playing cards) during which, or after which, one or more game event outcomes are determined and/or displayed.

The I/O device 440 may also comprise an output device, such as a display screen, a speaker, and/or a printer. Such an I/O device 440 may be used, for example, to indicate if an item will be provided to a player.

According to one embodiment, the processor 410 is also in communication with a Global Positioning System (GPS) device 450. The GPS device 450 may be used, for example, to determine a current location associated with a player (e.g., to determine if the player device 400 is currently within a particular retail store or jurisdiction). For example, the GPS device 450 may be used to determine when a player is currently near one or more items that he or she could receive based on a game event outcome.

The processor 410 is also in communication with a storage device 430. The storage device 430 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

The storage device 430 stores a program 415 for controlling the processor 410. The processor 410 performs instructions of the program 415, and thereby operates in accordance with the present invention. For example, the processor 410 may arrange for a player to purchase one or more game event outcomes and/or for the player to provide an indication of an item.

The program 415 may be stored in a compressed, uncompiled and/or encrypted format. The program 415 may furthermore include other program elements, such as an operating system, a database management system, and/or "device drivers" used by the processor 410 to interface with peripheral devices. Such program elements are known to those skilled in the art.

As used herein, information may be "received" by or "transmitted" to, for example: (i) the player device 400 from the merchant device 500 or the lottery provider device 600; or (ii) a software application or module within the player device 400 from another software application, module, or any other source.

As shown in FIG. 4, the storage device 430 also stores a player outcome database 700 (described with respect to FIG. 7).

Figure 16A:
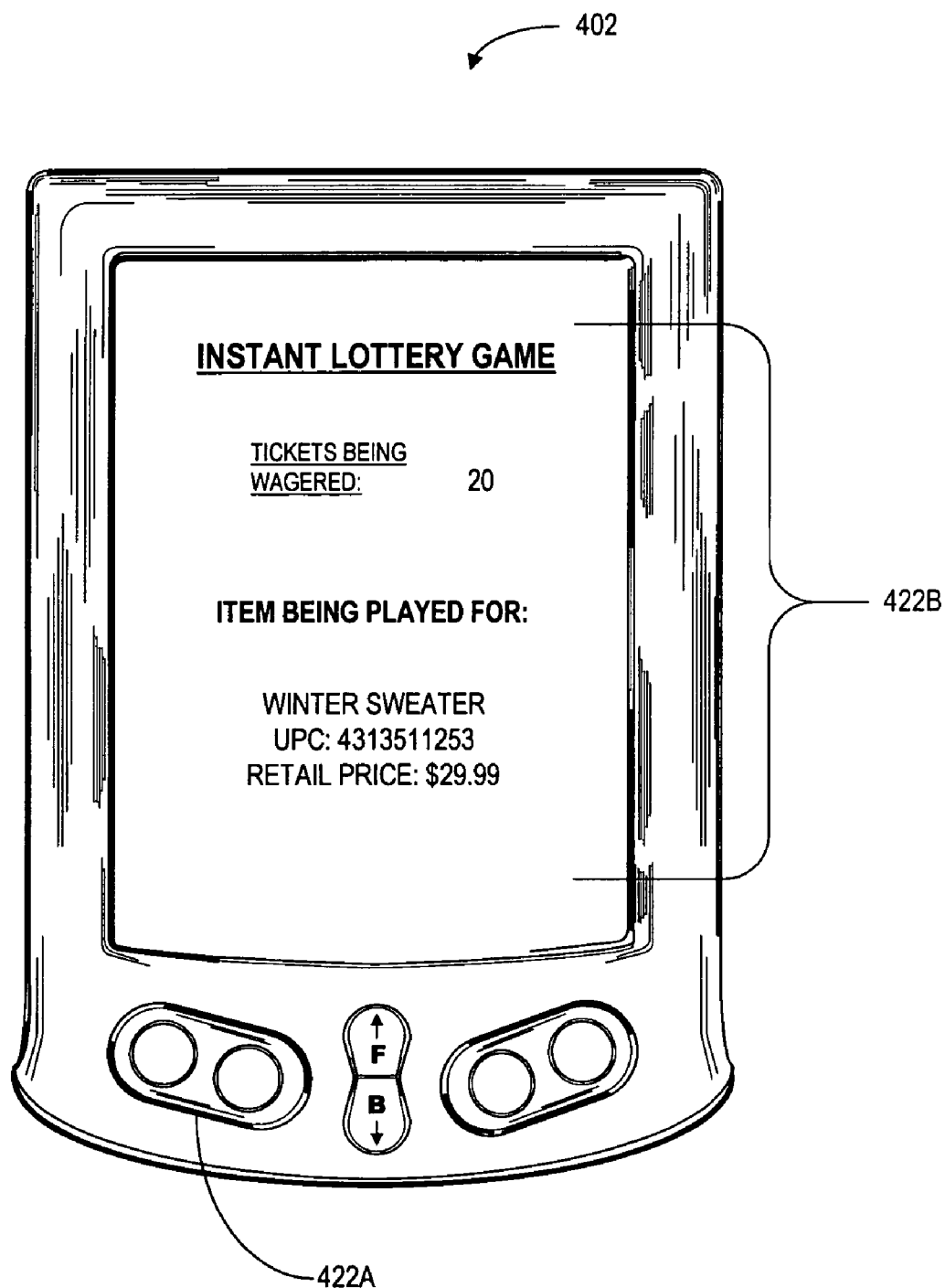
FIG. 16A illustrates a PDA displaying information according to an embodiment of the present invention.

FIG. 16A illustrates an embodiment of the present invention wherein the player device 400 comprises a PDA 402. The PDA 402 includes an input device 422A that a player can use to provide an indication associated with one or more items. The PDA 402 also includes an output device 422B (e.g., a display screen) that may be used to display if an item will be provided to the player.

Figure 16B:
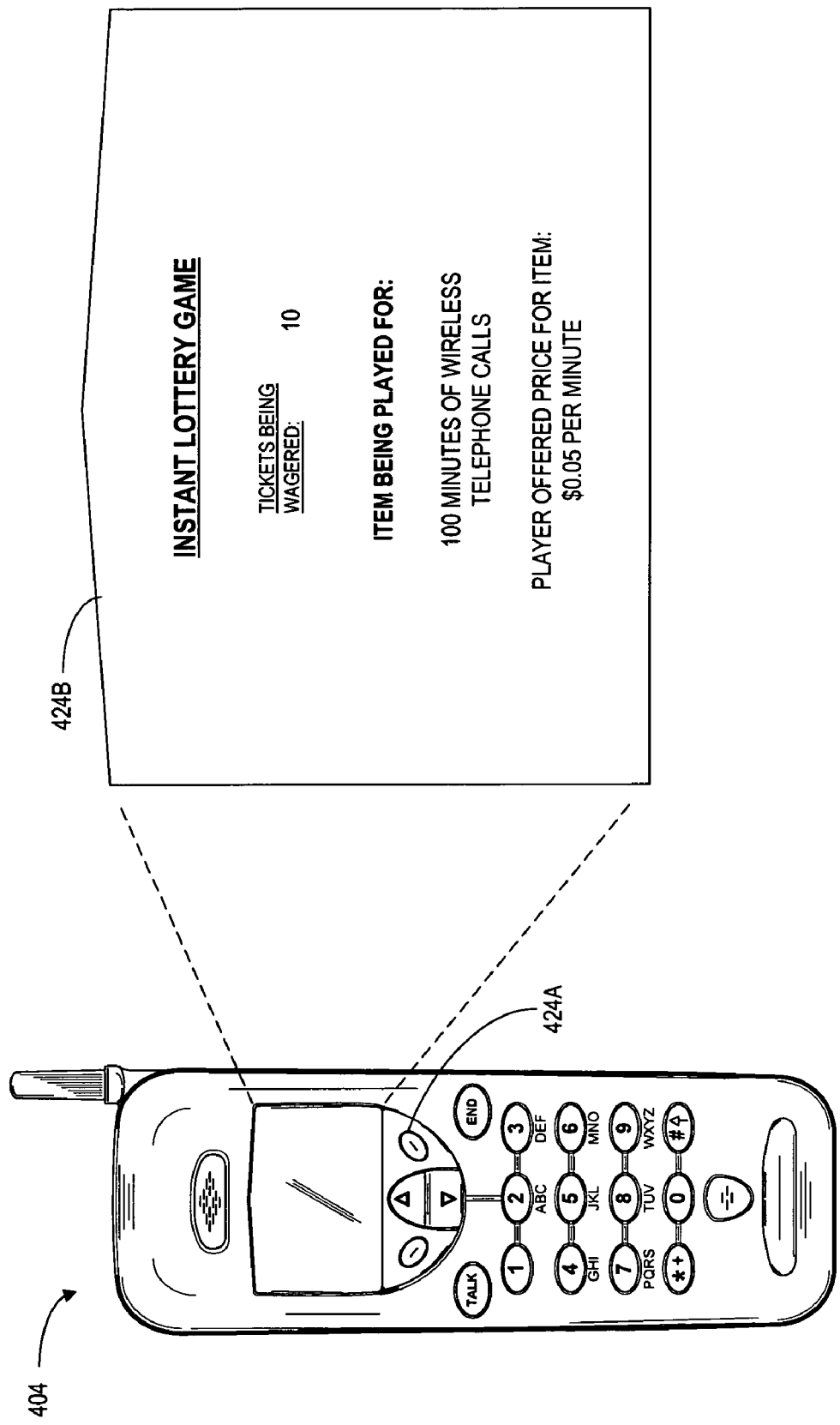
FIG. 16B illustrates a wireless telephone displaying information according to an embodiment of the present invention.

FIG. 16B illustrates an embodiment of the present invention wherein the player device 400 comprises a wireless telephone 404. The wireless telephone 404 includes an input device 424A that a player can use to provide an indication associated with one or more items. The wireless telephone 404 also includes an output device 424B (e.g., a display screen) that may be used to display if an item will be provided to the player.

Merchant Device

Figure 5:
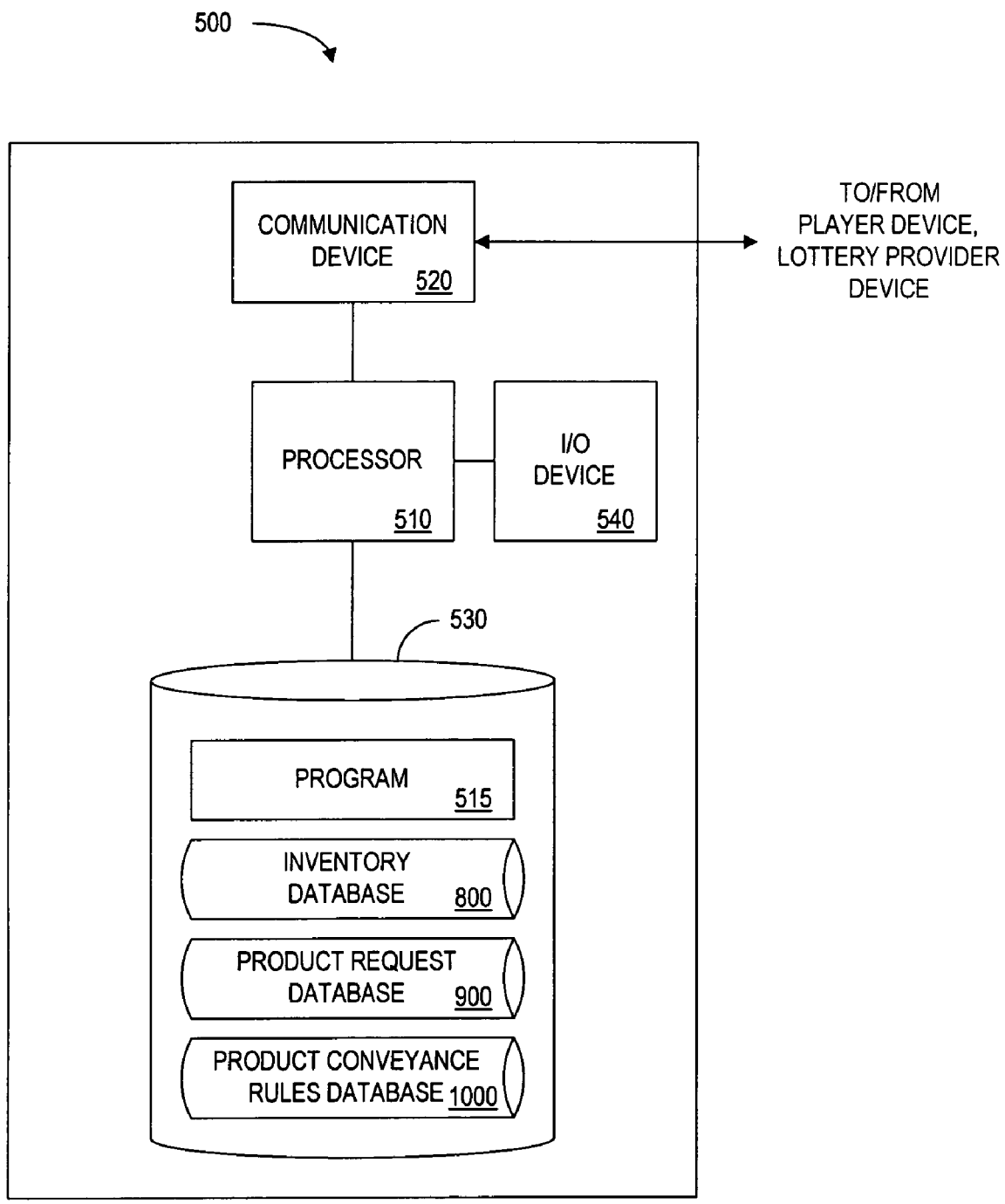
FIG. 5 is a block diagram of a merchant device according to an embodiment of the present invention.

FIG. 5 illustrates a merchant device 500 that is descriptive of the device shown in FIGS. 2A and 2B, according to an embodiment of the present invention. The merchant device 500 comprises a processor 510, such as one or more INTEL® Pentium® processors, coupled to a communication device 520 configured to communicate via a communication network (not shown in FIG. 5). The communication device 520 may be used to communicate, for example, with the player device 400 and/or the lottery provider device 600.

The processor 510 is also in communication with an I/O device 540. The I/O device 540 may comprise an input device, such as a keyboard, a mouse or other pointing device, a microphone, a knob or a switch (including an electronic representation of a knob or a switch), a bar code scanner (e.g., configured to read UPC codes), an infrared port, and/or a touch screen. Such an I/O device 540 may be used, for example, to receive an indication associated with an item and/or an indication of a game event outcome. The I/O device 540 may also comprise an output device, such as a display screen, a speaker, and/or a printer. Such an I/O device 540 may be used, for example, to indicate if an item will be provided to a player.

The processor 510 is also in communication with a storage device 530. The storage device 530 may comprise any appropriate information storage device, including combinations of magnetic storage devices (e.g., magnetic tape and hard disk drives), optical storage devices, and/or semiconductor memory devices such as RAM devices and ROM devices.

The storage device 530 stores a program 515 for controlling the processor 510. The processor 510 performs instructions of the program 515, and thereby operates in accordance with the present invention. For example, the processor 510 may arrange receive an indication of an item and/or a game event outcome. The processor 510 may also determine if an item will be provided to a player based on information about the item and one or more game event outcomes. The processor 510 may also arrange to receive payment in exchange for providing an item to a player.

The program 515 may be stored in a compressed, uncompiled and/or encrypted format. The program 515 may furthermore include other program elements, such as an operating system, a database management system, and/or "device drivers" used by the processor 510 to interface with peripheral devices. Such program elements are known to those skilled in the art.

As used herein, information may be "received" by or "transmitted" to, for example: (i) the merchant device 500 from the player device 400 or the lottery provider device 600; or (ii) a software application or module within the merchant device 500 from another software application, module, or any other source.

As shown in FIG. 5, the storage device 530 also stores an inventory database 800 (described with respect to FIG. 8), a product request database 900 (described with respect to FIG. 9), and a product conveyance rules database 1000 (described with respect to FIG. 10).

Lottery Provider Device

Figure 6:
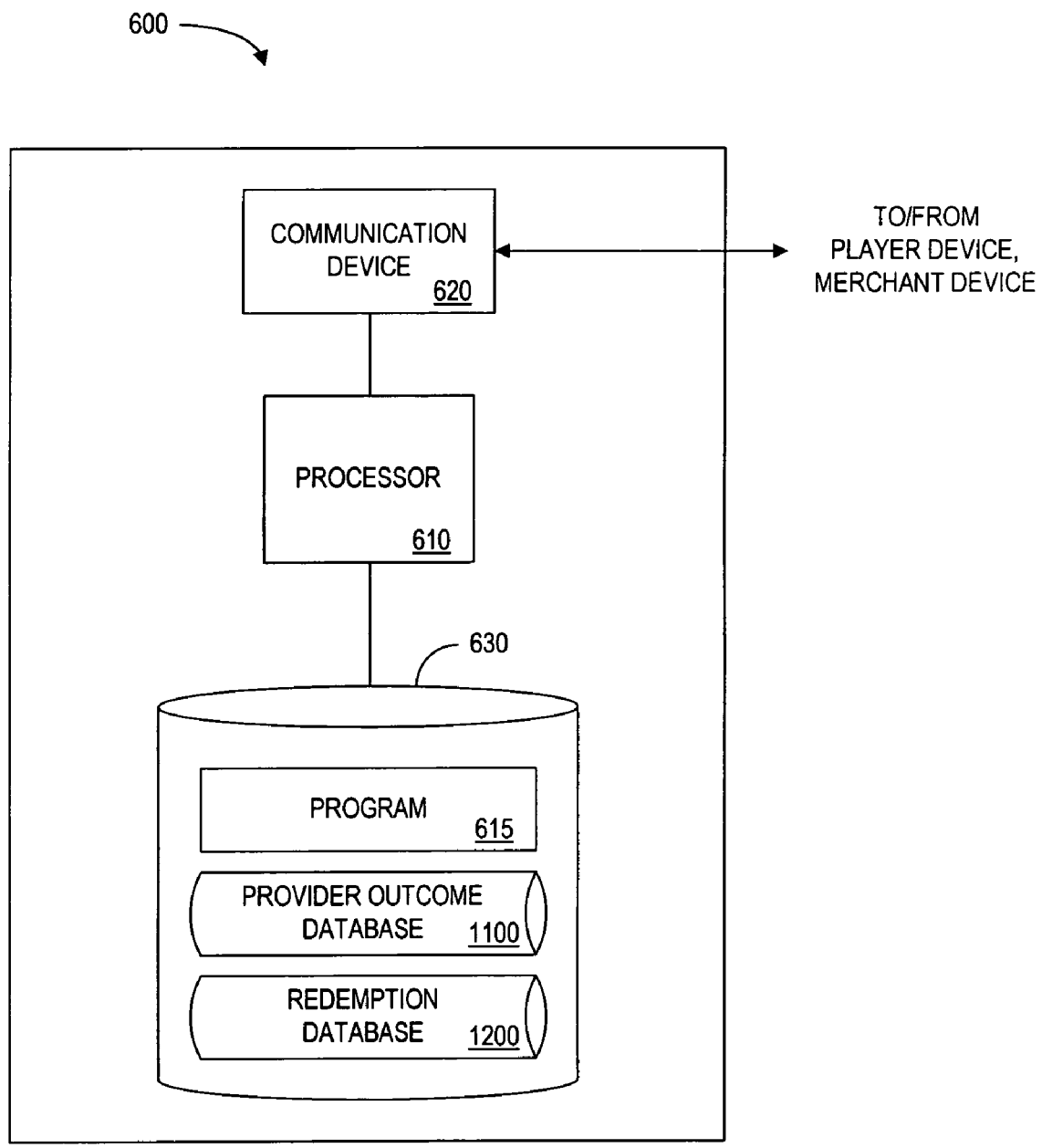
FIG. 6 is a block diagram of a lottery provider device according to an embodiment of the present invention.

FIG. 6 illustrates a lottery provider device 600 that is descriptive of the device shown in FIGS. 2A and 2B, according to an embodiment of the present invention. The lottery provider device 600 comprises a processor 610, such as one or more INTEL® Pentium® processors, coupled to a communication device 620 configured to communicate via a communication network (not shown in FIG. 6). The communication device 620 may be used to communicate, for example, with the player device 400 and/or the merchant device 500.

The processor 610 is also in communication with a storage device 630. The storage device 630 may comprise any appropriate information storage device, including combinations of magnetic storage devices (e.g., magnetic tape and hard disk drives), optical storage devices, and/or semiconductor memory devices such as RAM devices and ROM devices.

The storage device 630 stores a program 615 for controlling the processor 610. The processor 610 performs instructions of the program 615, and thereby operates in accordance with the present invention. For example, the processor 610 may arrange to sell one or more game event outcomes to a player and/or to associate such game event outcomes with a player or player device. The processor 610 may also arrange for a merchant to receive payment in exchange for providing an item to a player.

The program 615 may be stored in a compressed, uncompiled and/or encrypted format. The program 615 may furthermore include other program elements, such as an operating system, a database management system, and/or "device drivers" used by the processor 610 to interface with peripheral devices. Such program elements are known to those skilled in the art.

As used herein, information may be "received" by or "transmitted" to, for example: (i) the lottery provider device 600 from the player device 400 or the merchant device 500; or (ii) a software application or module within the lottery provider device 600 from another software application, module, or any other source.

Figure 12:
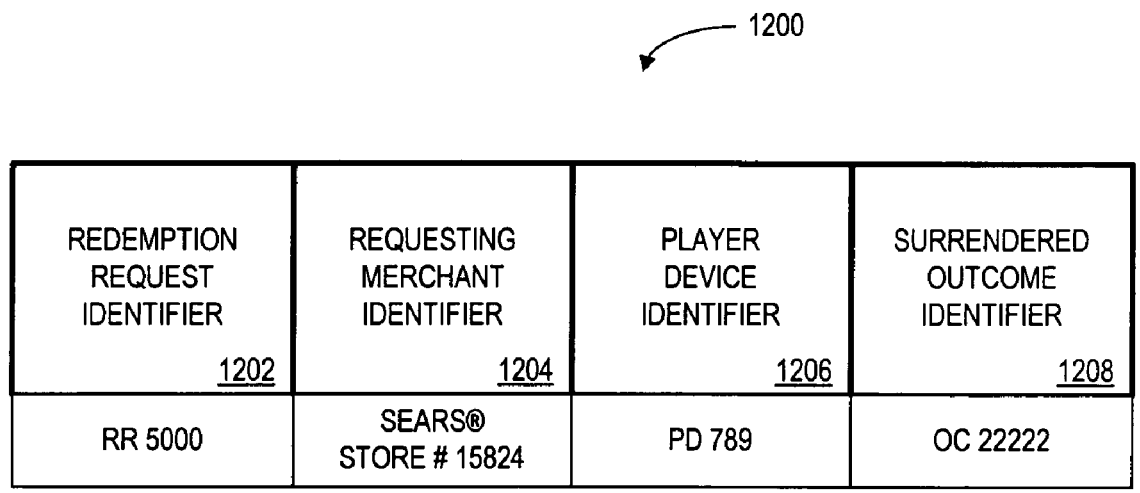
FIG. 12 is a tabular representation of a portion of a redemption database according to an embodiment of the present invention.

As shown in FIG. 6, the storage device 630 also stores a provider outcome database 1100 (described with respect to FIG. 11) and a redemption database (described with respect to FIG. 12).

Examples of databases that may be used in connection with the transaction systems 200, 250 will now be described in detail with respect to FIGS. 7 through 12. The illustrations and accompanying descriptions of the databases presented herein are exemplary, and any number of other database arrangements could be employed besides those suggested by the figures.

Player Outcome Database

Referring to FIG. 7, a table represents the player outcome database 700 that may be stored at the player device 400, according to an embodiment of the present invention. According to another embodiment, all or some of the information in the player outcome database 700 may instead be stored at the controller 260. The table includes a player device identifier 710. A player device identifier 710 may comprise, for example, any information associated with a player or a player device 400. For example, the player device identifier 710 may represent a user name associated with a player or a serial number associated with a player device 400.

The player outcome database 700 also includes entries identifying game event outcomes. The table defines fields 712, 714, 716, 718, 720 for each of the entries. The fields specify: an outcome identifier 712, an outcome value 714, an outcome format 716, an outcome status 718, and a redemption code 720. The information in the player outcome database 700 may be created and updated, for example, based on information received from the lottery provider device 600.

The outcome identifier 712 may be, for example, an alphanumeric code associated with a game event outcome. For each outcome, the player outcome database 700 also stores the outcome value 714 associated with the outcome. The outcome value may represent, for example, a payout amount (e.g., $0.50 or $10) or an event result (e.g., "win" or "lose").

The outcome format 716 may comprise, for example, any text, image, and/or audio information associated with the outcome (e.g., information that may be provided to the player via the player device 400). According to one embodiment, the outcome format 716 comprises a Java applet that can be executed by the player device 400.

The outcome status 718 indicates whether the outcome has been: purchased by the player but not yet revealed or otherwise used by the player ("not yet executed"); purchased by and revealed to the player, such as during game play ("executed"); or purchased by the player and used to receive one or more products ("surrendered").

Each outcome may also be associated with a redemption code 720 may be, for example, a code that can be used by a merchant device 500 to verify the validity of the outcome. The redemption code 720 may comprise, for example, a verifiable hash code or a human-recognizable code.

Inventory Database

Referring to FIG. 8, a table represents the inventory database 800 that may be stored at the merchant device 500, according to an embodiment of the present invention. According to another embodiment, all or some of the information in the inventory database 800 may instead be stored at the controller 260. The table includes entries identifying products that may be provided to a player. The table also defines fields 802, 804, 806, 808, 810, 812 for each of the entries. The fields specify: a product identifier 802, a product type 804, a product description 806, a current retail price 808, a current available quantity 810, a projected available quantity 812, and product conveyance rule identifier(s) 814. The information in the inventory database 800 may be created and updated, for example, based on information received from an inventory system associated with a merchant.

The product identifier 802 may be, for example, an alphanumeric code associated with a product that may be provided to a player in accordance with the present invention. For each product, the inventory database 800 also stores a product type 804 (e.g., indicating a category of product), a product description 806 (e.g., describing the product), and a current retail price 808 associated with the product. The current retail price 808 may be, for example, compared to one or more game event outcomes to determine if a product will be provided to a player.

In addition to the current retail price 808, revenue management information may be used to determine if a product will be provided to a player. For example, the current available quantity 810 and the projected available quantity 812 may be used to determine if game event outcomes worth less than the current retail price 808 should be accepted in exchange for the product. The product conveyance rule identifier(s) 814 indicate the rules that may be used to determine if a product will be provided to the player. Some example rules are described with respect to the product conveyance rules database 1000 shown in FIG. 10.

Product Request Database

Figure 9:
FIG. 9 is a tabular representation of a portion of a product request database according to an embodiment of the present invention.

Referring to FIG. 9, a table represents the product request database 900 that may be stored at the merchant device 500, according to an embodiment of the present invention. According to another embodiment, all or some of the information in the product request database 900 may instead be stored at the controller 260. The table includes entries identifying product requests that may be received, for example, from a player device 400 or a lottery provider device 600. The table also defines fields 902, 904, 906, 908, 910, 912, 914 for each of the entries. The fields specify: a product conveyance request identifier 902, a requested product identifier 904, a player device identifier 906, a request time and date 908, a request status 910, surrendered outcome identifier(s) 912, and surrendered outcome identifier redemption code(s) 914. The information in the product request database 900 may be created and updated, for example, based on information received from a player or a player device 400.

The product conveyance request identifier 902 may be, for example, an alphanumeric code associated with a request from a player to receive a product based on one or more game event outcomes. For each such request, the product request database 900 also stores the requested product identifier 904, which may be based on, or associated with, the product identifier 802 stored in the product database 800. Similarly, the player device identifier represents the player or device that provided the request and may be based on, or associated with, the player device identifier 710 stored in the player outcome database 700.

The request time and date 908 indicate when the request was received by the merchant device 500. The request status 910 may indicate, for example, whether or not the product will in fact be provided to the player based on his or game event outcomes (e.g., "accepted" or "declined"). The surrendered outcome identifier(s) 912 represent the game event outcomes provided by the player in connection with the product request, and may be based on, or associated with the outcome identifiers 712 stored in the player outcome database 700. Similarly, the surrendered outcome identifier redemption code(s) 912 may be used to validate the surrendered outcome identifiers(s) 912 and may be based on, or associated with the redemption codes 720 stored in the player outcome database 700.

Product Conveyance Rules Database

Referring to FIG. 10, a table represents the product conveyance rules database 1000 that may be stored at the merchant device 500, according to an embodiment of the present invention. According to another embodiment, all or some of the information in the product conveyance rules database 1000 may instead be stored at the controller 260. The table includes entries identifying rules used to determine if a product can be provided to a player. The table also defines fields 1002, 1004 for each of the entries. The fields specify: a product conveyance rule identifier 1002 and a product conveyance rule 1004. The information in the product conveyance rules database 1000 may be created and updated, for example, based on information received from an operator associated with a merchant.

The product conveyance rule identifier 1002 may be, for example, an alphanumeric code associated with a rule used to determine if a product can be provided to a player. The product conveyance rule identifier 1002 may be based on, or associated with, the product conveyance rule identifier 814 stored in the product database 800.

For each rule, the product conveyance rules database 1000 also stores the product conveyance rule 1004 describing the conditions required in order to provide a product to a player. For example, a product may be provided to a player only when an outcome value (e.g., a value associated with one or more game event outcomes) is within a predetermined range of a current retail price 808 associated with that product. Another example of a product conveyance rule 1004 is shown in the first entry of FIG. 10. In this case, a product may be provided to a player only when a projected available quantity (e.g., a quantity that is projected to be available in seven days) is at least equal to eighty percent of a current available quantity. Note that such a product conveyance rule 1004 may also include, for example, other conditions associated with an outcome value and/or a current retail price 808.

Provider Outcome Database

Referring to FIG. 11, a table represents the provider outcome database 1100 that may be stored at the lottery provider device 600, according to an embodiment of the present invention. According to another embodiment, all or some of the information in the provider outcome database 1100 may instead be stored at the controller 260. The table includes entries identifying game event outcomes that have been sold to a player. The table also defines fields 1102, 1104, 1106, 1108, 1110 for each of the entries. The fields specify: an outcome identifier 1102, an outcome value 1104, an outcome status 1106, a player device identifier 1108, and a redemption code 1110. The information in the provider outcome database 1100 may be created and updated, for example, before a player purchases one or more game event outcomes.

The outcome identifier 1102 may be, for example, an alphanumeric code associated with a game event outcome that has been purchased by a player and may be based on, or associated with, the outcome identifier 702 stored in the player outcome database 700.

For each outcome, the provider outcome database 1100 also stores the outcome value 1104 associated with the outcome. The outcome value may be, for example, based on or associated with the outcome value 714 stored in the player outcome database 700.

The outcome status 1106 indicates whether or not the outcome has been revealed or otherwise used by the player ("redeemed" or "outstanding"). The player device identifier 1108 indicates the device associated with the player who purchased the outcome and may be based on, or associated with, the player device identifier 710 stored in the player outcome database 700.

Each outcome may also be associated with a redemption code 1110 may be, for example, a code that can be used by a merchant device 500 to verify the validity of the outcome. The redemption code 1110 may comprise, for example, a verifiable hash code or a human-recognizable code.

Redemption Database

Referring to FIG. 12, a table represents the redemption database 1200 that may be stored at the lottery provider device 600, according to an embodiment of the present invention. According to another embodiment, all or some of the information in the redemption database 1200 may instead be stored at the controller 260. The table includes entries identifying requests from a merchant to receive payment. The table also defines fields 1202, 1204, 1206, 1208 for each of the entries. The fields specify: a redemption request identifier 1202, a requesting merchant identifier 1204, a player device identifier 1206, and a surrendered outcome identifier 1208. The information in the redemption database 1200 may be created and updated, for example, based on information received from the merchant device 500.

The redemption identifier 1202 may be, for example, an alphanumeric code associated with a request by a merchant to receive payment. For each request, the redemption database 1200 also stores the requesting merchant identifier 1204 and player device identifier 1206 associated with the request. The player device identifier 1206 may be based on, or associated with, the player device identifier 710 stored in the player outcome database 700 and/or the player device identifier 1108 stored in the provider outcome database 1100.

The surrendered outcome identifier 1208 is associated with a game event outcome redeemed by a player, and may be based on the outcome identifier 712 stored in the player outcome database 700 and/or the surrendered outcome identifier(s) 912 stored in the product request database 900. According to an embodiment of the present invention, the surrendered outcome identifier 1208 is used to determine an amount of payment to be provided to the merchant in response to the redemption request (e.g., based on the outcome value 1104 stored in the provider outcome database 1100).

Methods that may be used in connection with the transaction systems 200, 250 according to an embodiment of the present invention will now be described in detail with respect to FIGS. 13 through 15.

Transaction System Methods

Figure 13:
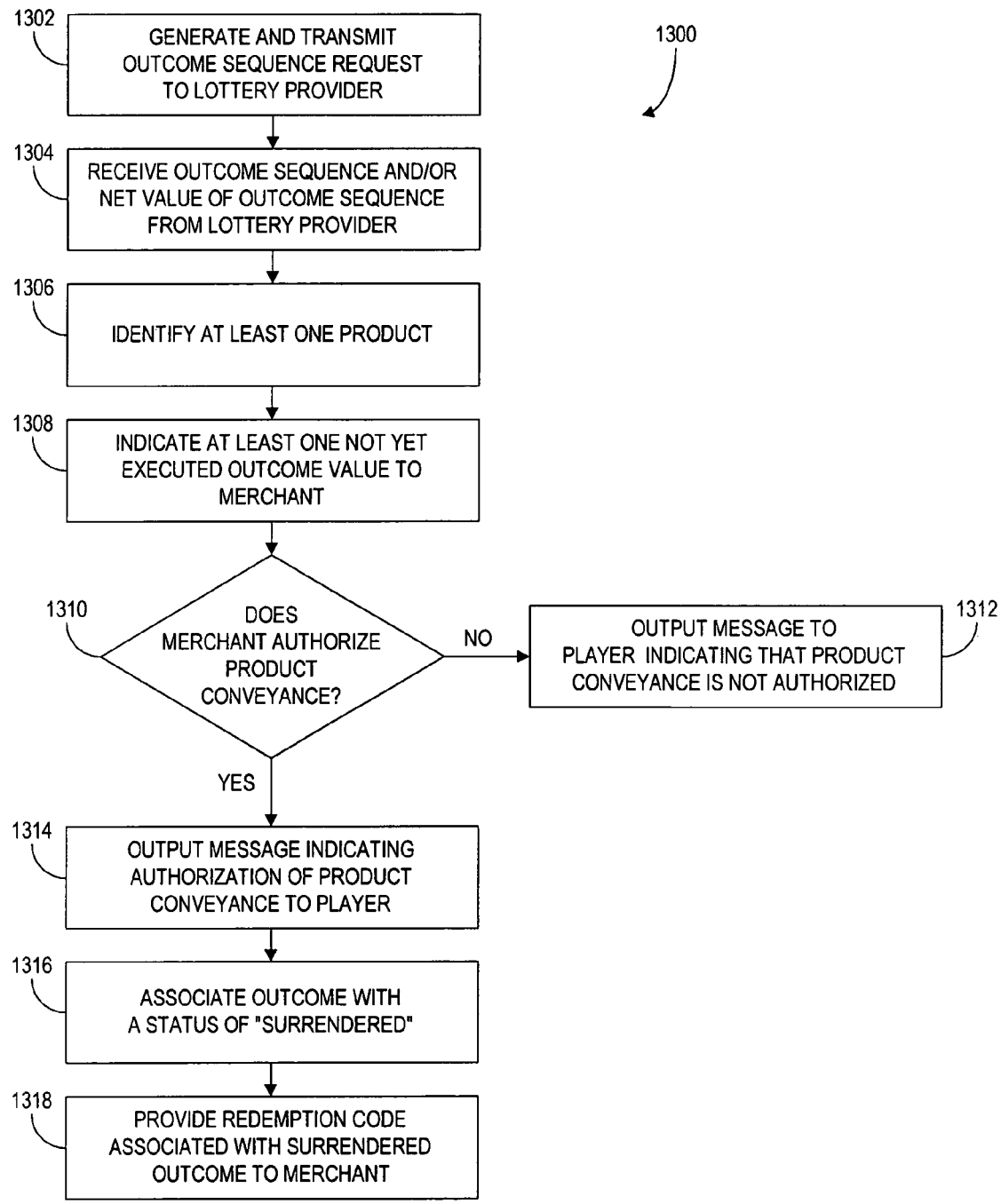
FIG. 13 is a flow chart of a method for facilitating transactions that may be performed by a player or a player device according to an embodiment of the present invention.

FIG. 13 is a flow chart of a method for facilitating transactions 1300 that may be performed by a player or player device 400 according to an embodiment of the present invention. The flow chart in FIG. 13, as well as the other flow charts discussed herein, does not imply a fixed order to the steps, and embodiments of the present invention can be practiced in any order that is practicable. Moreover, the method may be performed by any device described herein, including the controller 260.

At 1302, a game event outcome sequence request is generated and transmitted to a lottery provider. An outcome sequence and/or a net value of the outcome sequence is then received from the lottery provider at 1304. According to one embodiment of the present invention, the received outcome sequence is then stored in the player outcome database 700.

At 1306, at least one product is identified. For example, the player may use his or her PDA to request a price for a product. According to another embodiment, the player may bring the product to a POS terminal to identify that he or she is interested in receiving the product.

At 1308, at least one outcome value having an outcome status 718 of "not yet executed" is indicated to the merchant. For example, a player may select three game event outcomes via his or her PDA, and the outcome value 714 associated with those events may be transmitted to a merchant POS terminal.

A signal indicating if the merchant authorizes conveyance of the product to the player is received. If the signal indicates that the merchant does not authorize conveyance of the product to the player at 1310, the appropriate message is output to the player at 1312.

If the signal indicates that the merchant does authorize conveyance of the product at 1310, the player is informed at 1314 and the outcome status 718 is updated to "surrendered" at 1316. The appropriate redemption code (or codes) 720 are then provided to the merchant at 1318 to allow the player to take possession of the product. According to one embodiment, the redemption code 720 may be a verifiable "hash" value generated when player and/or event information are used with a hash function, such as a one-way hash function. A hash function is a transformation that takes input information and returns a hash value. In general, one can think of a hash value as a "digital fingerprint" of the input information. For example, the input information to the hash function may be a player device identifier 710 and information about an outcome (e.g., an outcome identifier 712 and outcome value 714). In this case, the hash function would generate the redemption code 720 based on the input information. The merchant device 500 could then validate the redemption code 720 using an associated function. Applicable hash functions and other encryption techniques are described in Bruce Schneier, "Applied Cryptography: Protocols, Algorithms, and Source Code in C" (John Wiley & Sons, Inc., 2nd Ed. 1996).

Note that the redemption code 720 may, for example, be provided to the player in a human-recognizable format or may be stored on the player device 400. For example, a lottery provider device 600 may store the redemption code 720 using the player's PC, such as by storing the redemption code as a "cookie." A cookie may be a block of data that a Web server (e.g., the lottery provider device 600) stores on a client system (e.g., the player device 400). When a player returns to the same Web site, or an associated Web site, the browser of the player device 400 sends a copy of the cookie back to the Web server. Cookies may be used to identify players associated with the player device 400, to instruct the Web server to send a customized version of a Web page, to store game event outcomes associated with a player, and for other purposes.

Figure 14:
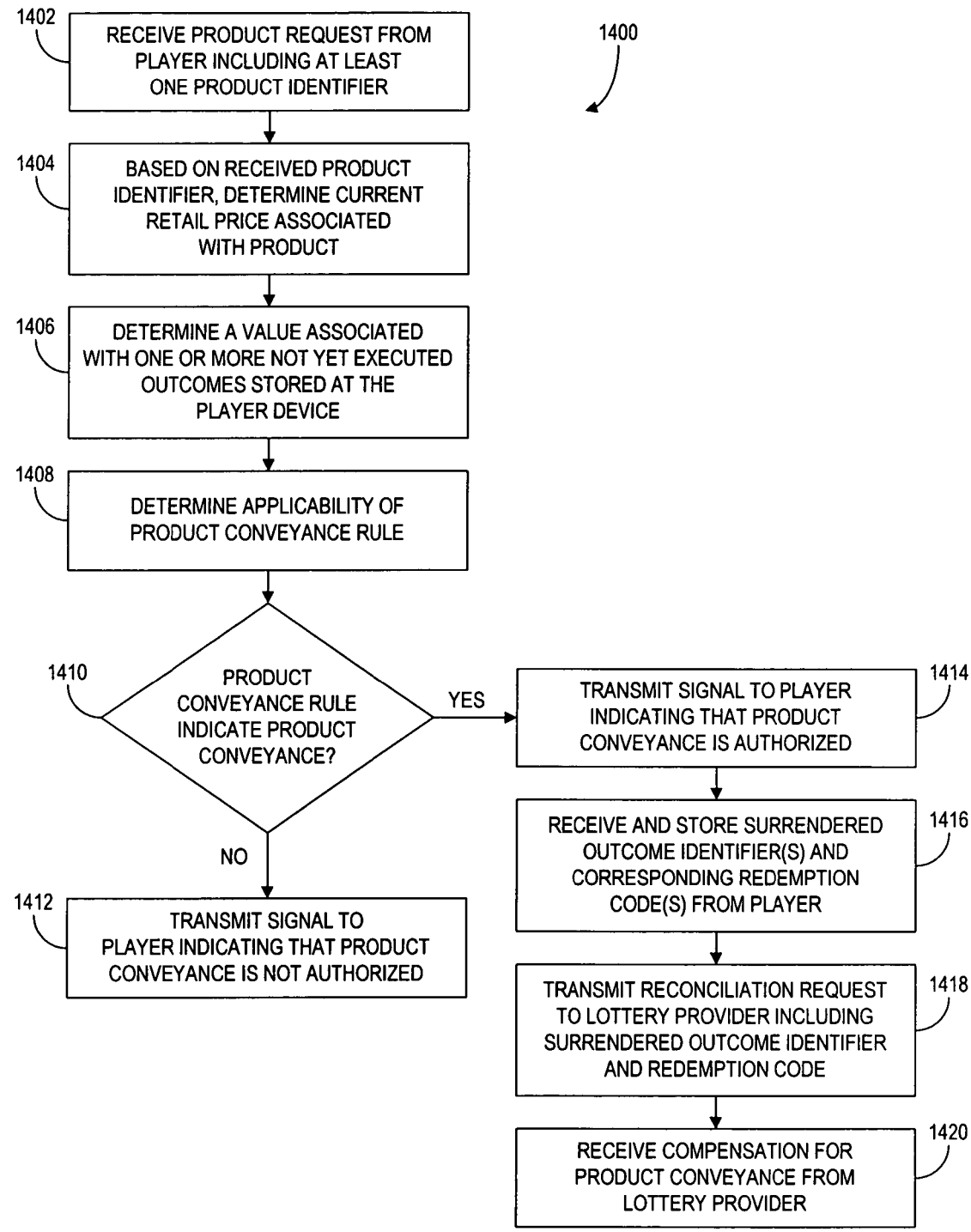
FIG. 14 is a flow chart of a method for facilitating transactions that may be performed by a merchant or a merchant device according to an embodiment of the present invention.

FIG. 14 is a flow chart of a method for facilitating transactions 1400 that may be performed by a merchant or merchant device 500 according to an embodiment of the present invention. At 1402, a product request including at least one product identifier 802 is received from a player. Based on the received product identifier 802, a current retail price 808 associated with the product is determined at 1404. Moreover, outcome values 714 associated with one or more outcomes having an outcome status 718 of "not yet executed" are determined at 1406. For example, the merchant may receive the product identifier 802 together with the outcome values 714 directly from the player device 400.

At 1408, the applicability of one or more product conveyance rules are determined. Such a determination may be based on, for example, the product conveyance rule identifiers 814 stored in the product database 800 and the associated product conveyance rule 1004 stored in the product conveyance rule database 1000.

If the product conveyance rule 1004 indicates that the product will not be conveyed at 1410, an appropriate message is transmitted to the player at 1412.

If the product conveyance rule 1004 indicates that the product will be conveyed at 1410, an appropriate message is transmitted to the player at 1414. The surrendered outcome identifier(s) 912 and corresponding surrendered outcome identifier redemption codes 914 are received and stored in the produce conveyance request database 900. According to one embodiment, the merchant also validates the received surrendered outcome identifier redemption codes 914 (e.g., by communicating with the lottery provider device 600).

At 1418, a reconciliation request, including the surrendered outcome identifier(s) 912 and corresponding surrendered outcome identifier redemption codes 914, is transmitted to the lottery provider. The merchant then receives compensation in exchange for providing the product to the player at 1420.

Figure 15:
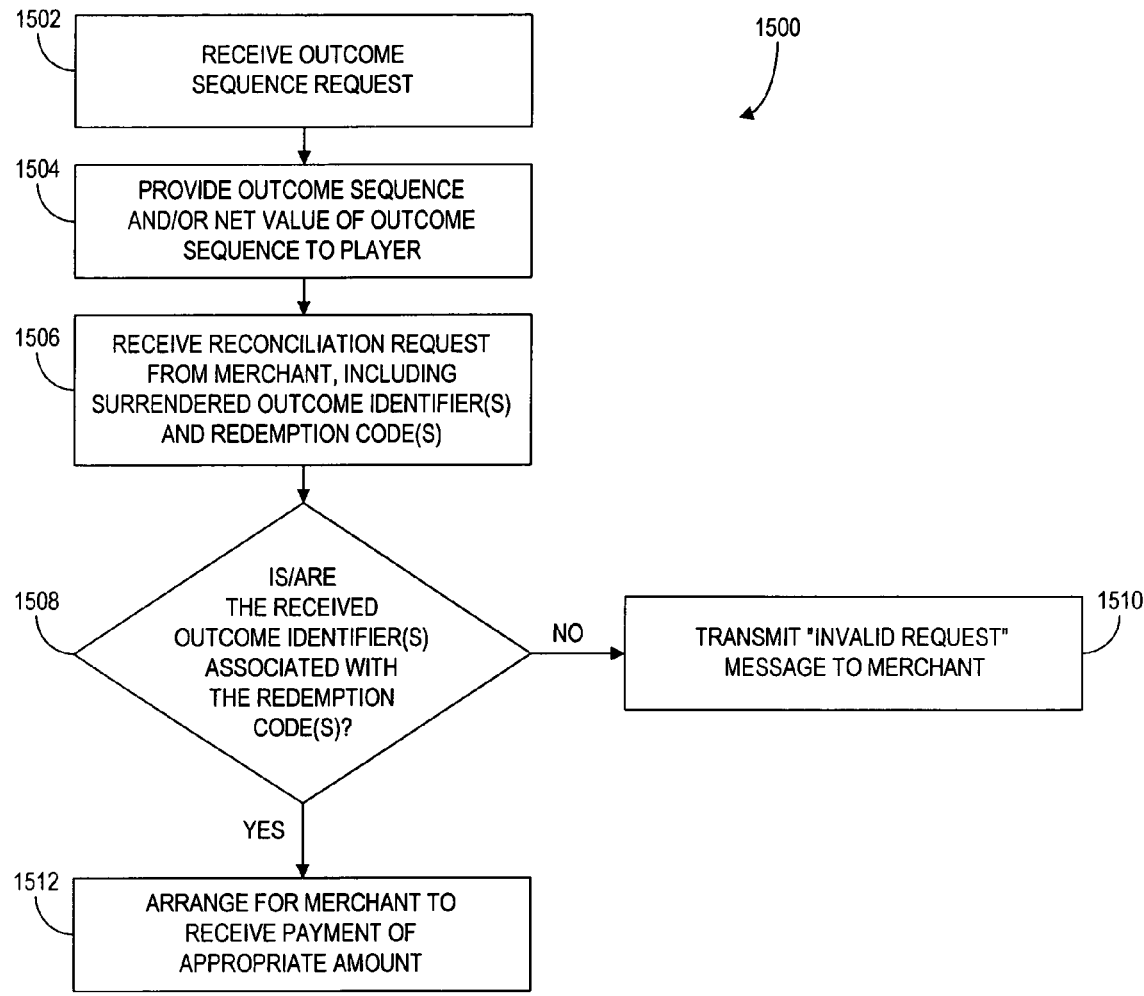
FIG. 15 is a flow chart of a method for facilitating transactions that may be performed by a lottery provider or a lottery provider device according to an embodiment of the present invention.

FIG. 15 is a flow chart of a method for facilitating transactions 1500 that may be performed by a lottery provider or lottery provider device 600 according to an embodiment of the present invention. At 1502, an outcome sequence request is received. For example, a request for twenty game event outcomes may be received from the player device 400 along with an appropriate payment.

At 1504, an outcome sequence and/or a net value of the outcome sequence is provided to the player. Moreover, the appropriate information may be stored in the provider outcome database 1100.

At 1506, a reconciliation request, including the surrendered outcome identifier(s) 912 and corresponding surrendered outcome identifier redemption codes 914, is received from a merchant. If the received surrendered outcome identifier(s) 912 do not correspond to the received surrendered outcome identifier redemption codes 914 (e.g. based on the outcome identifiers 1102 and redemption codes 1110 stored in the provider outcome database 1100) at 1508, an appropriate message is transmitted to the merchant.

If the received surrendered outcome identifier(s) 912 do correspond to the received surrendered outcome identifier redemption codes 914 (e.g., based on information stored in the provider outcome database 1100) at 1508, it is arranged for the merchant to receive payment of the appropriate amount (e.g., based on the outcome values 1104 stored in the provider outcome database 1100). In this way, the merchant receives payment in exchange for providing the product to the player. Moreover, the player may receive the product at a reduced price, without that reduced price being revealed to the player.

Additional Embodiments

The following illustrates various additional embodiments of the present invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

According to some of the embodiments described above, a player may provide one or more game event outcomes in an attempt to receive an item for free or at a reduced price (e.g., a player-defined reduced price). According to another embodiment, a player may attempt to receive a first item at a price associated with a second item. For example, a player may attempt to receive a premium item at a price associated with a generic item.

According to one embodiment, a player indicates how many game event outcomes he or she would like to apply to a transaction. According to another embodiment, a player indicates that as many game event outcomes as are necessary to complete the transaction should be applied. For example, a player may indicate a movie ticket and indicate that as many one dollar lottery event outcomes as are necessary should be applied to the transaction. In this case, a merchant device 500 may provide the movie ticket to the player along with an indication that, for example, as few as one or as many as seven lottery event outcomes were applied to the transaction.

According to another embodiment, the determination of whether an item will be provided to a player is further based on information about the player. The information about the player may include, for example: a location, a player status (e.g., indicating if the player has recently registered with a controller 260 or has previously purchased a large number of events via the controller 260), and/or demographic information.

According to other embodiments, the determination of whether an item will be provided to a player is further based on, for example: a time of day, a time of year, and/or revenue management information (supply and/or demand information associated with a controller 260).

According to one embodiment, one or more game parameters (e.g., a probability of winning and/or a number of game event outcomes) are dynamically calculated and displayed to the player. For example, as the player adjusts a graphical representation of a sliding scale labeled "game event outcome amount variation," a display indicating a probability of winning an item may be updated and displayed to the player at each end of the scale. According to another embodiment, a player may select a predetermined parameter package from a group of packages (e.g., associated with a set of game event preferences). According to another embodiment, the transaction system 200 may suggest a particular package, or a modification to one or more game parameters, to the player. According to one embodiment, the transaction system 200 may automatically modify one or more game parameters.

According to another embodiment, paper game tickets are provided to the player. For example, a player may use a kiosk located at a merchant's store to provide paper game tickets (e.g., scratch-off type tickets that have not been revealed to the player), and the kiosk may determine if an item should be offered to the player.

According to another embodiment, the transaction system 200 receives an indication that a player is purchasing a product asks the player if he or she would be interested in receiving a supplemental product (e.g., a peripheral) based on one or more game event outcomes.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A method comprising:
   receiving, by a first device from a second device, information regarding a total payout amount of electronic scratch-off lottery tickets stored on the second device, wherein the total payout amount has not been disclosed to a player;
   receiving, by the first device, from the player an indication, after receiving the total payoff amount information and wherein the total payout amount has not been disclosed to the player, of an item that the player is interested in winning;
   determining, by the first device, a value of the item; and
   arranging, via the first device, for the player to receive the item based on whether the total payout amount is within a defined range of the value of the item.

2. The method of claim 1, wherein the item comprises at least one of:
   (i) a product,
   (ii) a service,
   (iii) an alternate currency amount,
   (iv) a reduction in a retail price associated with the item,
   (v) a reduction of an amount previously owed by the player,
   (vi) a future game event, and
   (vii) an increase in an amount of payment to be received by the player.

3. The method of claim 1, wherein receiving from a second device comprises:
   receiving from at least one of: (i) a player device, and (ii) a merchant device.

4. The method of claim 1, wherein receiving from a second device is performed via at least one of:
   (i) a Web site,
   (ii) the Internet,
   (iii) a gaming device,
   (iv) a personal digital assistant,
   (v) a kiosk,
   (vi) an electronic mail message,
   (vii) postal mail,
   (viii) a telephone,
   (ix) an interactive voice response unit,
   (x) an operator terminal,
   (xi) a point of sale terminal, and
   (xii) a shopping cart device.

5. The method of claim 1, wherein the indication includes at least one of: (i) an item identifier, (ii) an item category, and (iii) an item feature.

6. The method of claim 1, wherein the indication includes at least one of: (i) an item price, (ii) a reduced item price, (iii) a player-defined item price, and (iv) a player-selected item price.

7. The method of claim 1, wherein the information regarding a total payout amount includes a probability of the player receiving the item.

8. The method of claim 1, wherein the information regarding a total payout amount includes a player identifier.

9. The method of claim 1, wherein the information regarding a total payout amount includes a game event identifier.

10. The method of claim 1, wherein the information regarding a total payout amount includes a pre-stored outcome.

11. The method of claim 1, further comprising:
    displaying a list of available items to the player and
    wherein receiving the indication of the item includes receiving a selection from the list of available items.

12. The method of claim 1, further comprising:
    in response to the received indication, offering to provide a substitute item to the player, and
    wherein arranging includes arranging for the player to receive the substitute item based on whether the total payout amount is within a defined range of the value of the substitute item.

13. The method of claim 1, wherein receiving the indication of the item includes receiving an indication that the player is interested in purchasing the item.

14. The method of claim 1, further comprising:
    charging the player a fee to play the electronic scratch-off lottery tickets to win the indicated item.

15. The method of claim 1, wherein the electronic scratch-off lottery tickets are associated with a lottery provider, and
    wherein arranging for the player to receive the item includes arranging for the player to receive the item from a retail store where the item is offered for sale.

16. The method of claim 1, wherein a seller arranges for the item to be provided to the player in exchange for payment of an amount based on a difference between the total payout amount and the value of the item.

17. The method of claim 1, wherein the indication of the item comprises at least one of:

(i) a retail price,
(ii) an item cost,
(iii) a minimum acceptable price,
(iv) a minimum acceptable profit,
(v) a discount amount,
(vi) a product conveyance rule,
(vii) revenue management information,
(viii) supply information, and
(ix) demand information.

18. The method of claim 1, wherein arranging for the player to receive the item is further based on at least one of: (i) information associated with the player, (ii) information associated with a merchant, (iii) information associated with a lottery provider, and (iv) information associated with a seller.

19. The method of claim 1, wherein arranging for the player to receive the item further includes:
transmitting a transaction request, including the total payout amount, to a merchant device; and
receiving a transaction response from the merchant device, wherein arranging for the player to receive the item is further based on the transaction response.

20. The method of claim 1, wherein arranging for the player to receive the item further comprises:
converting the total payout amount to an alternate currency associated with a merchant.

21. The method of claim 1, wherein arranging for the player to receive the item further comprises:
based on the indication of the item, adjusting information associated with a game event in accordance with at least one of: (i) a predetermined formula, (ii) a predetermined rule, and (iii) a conversion table.

22. The method of claim 1, wherein arranging for the player to receive the item comprises:
transmitting information enabling the item to be delivered to the player.

23. The method of claim 1, wherein arranging for the player to receive the item comprises:
transmitting information enabling the player to take possession of the item.

24. The method of claim 1, wherein at least one of (i) the information regarding the total payout amount, and (ii) an outcome associated with a game event are not displayed to the player.

25. The method of claim 1, further comprising:
determining at least one of:
(i) an event wager amount,
(ii) a number of game events, and
(iii) a probability that the item will be provided to the player.

26. The method of claim 1, further comprising:
displaying to the player at least one of:
(i) a required wager amount,
(ii) a required number of game events,
(iii) a suggested wager amount,
(iv) a suggested number of game events, and
(v) a probability that the item will be provided to the player.

27. The method of claim 1, wherein the item is provided to the player by a merchant, and further comprising:
arranging for the merchant to receive payment in exchange for providing the item to the player.

28. The method of claim 1, further comprising:
determining an excess payout amount; and
arranging for the excess payout amount to be provided to at least one of:
(i) a lottery provider,
(ii) a merchant that provided the item to the player,
(iii) a seller that sold the item to the player, and
(iv) the player.

29. The method of claim 1, wherein information associated with the item is incorporated into play of a game associated with the total payout amount.

30. An apparatus comprising:
means for receiving from a device information regarding a total payout amount of electronic scratch-off lottery tickets stored on the device, wherein the total payout amount has not been disclosed to a player;
means for receiving from the player an indication, after receipt of the total payout amount information and wherein the total payout amount has not been disclosed to the player, of an item that the player is interested in winning;
means for determining a value of the item; and
means for arranging for the player to receive the item based on whether the total payout amount is within a defined range of the value of the item.

31. An apparatus, comprising:
a processor; and
a storage device in communication with said processor and storing instructions adapted to be executed by said processor to:
receive from a device information regarding a total payout amount of electronic scratch-off lottery tickets stored on the device, wherein the total payout amount has not been disclosed to a player;
receive from the player an indication, after receipt of the total payout amount information and wherein the total payout amount has not been disclosed to the player, of an item that the player is interested in winning;
determine a value of the item; and
arrange for the player to receive the item based on whether the total payout amount is within a defined range of the value of the item.

32. The apparatus of claim 31, wherein the storage device further stores at least one of:
(i) an player outcome database,
(ii) an inventory database,
(iii) a product request database,
(iv) a product conveyance database,
(v) a redemption database, and
(vi) a provider outcome database.

33. The apparatus of claim 31, further comprising:
a communication device coupled to the processor and adapted to communicate with at least one of:
(i) a player device,
(ii) a lottery device,
(iii) a merchant device,
(iv) a controller,
(v) a subsidy provider device,
(vi) a seller device, and
(vii) a payment device.

34. A medium storing instructions adapted to be executed by a processor to perform a method comprising:
receive, by a first device from a second device, information regarding a payout amount of an electronic lottery ticket stored on the device, wherein the payout amount has not been disclosed to the player;

receive, by the first device from the player an indication, after receipt of the payout amount information and wherein the payout amount has not been disclosed to the player, of an item that the player is interested in winning;

determine, by the first device, a price of the item; and arrange, via the first device, for the player to receive the item based on whether the price of the item is less than or equal to the payout amount.

35. A computer-implemented method comprising:

receiving, by a first device from a player device information regarding an outcome of a lottery ticket stored on the player device, wherein the outcome includes a payout amount that has not been disclosed to a player;

receiving, by the first device from the player, after receiving the payout amount information and wherein the payout amount has not been disclosed to the player, an indication of an item that the player is interested in winning;

determining, by the first device, a price of the item; and arranging, via the first device, for the player to receive the item based on the outcome and if the price of the item is less than or equal to the payout amount.

* * * * *